US012783429B2

(12) United States Patent
Wang et al.

(10) Patent No.: US 12,783,429 B2
(45) Date of Patent: Nov. 3, 2026

(54) DUAL BIOS SYSTEM, SYSTEM SWITCHING METHOD AND APPARATUS, DEVICE, AND STORAGE MEDIUM

(71) Applicant: SUZHOU METABRAIN INTELLIGENT TECHNOLOGY CO., LTD., Suzhou (CN)

(72) Inventors: Bing Wang, Suzhou (CN); Zhaohui Liu, Suzhou (CN); Daotong Li, Suzhou (CN); Xiuqiang Sun, Suzhou (CN); Peng Chen, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/141,702

(22) PCT Filed: May 28, 2024

(86) PCT No.: PCT/CN2024/095662

§ 371 (c)(1),
(2) Date: Jun. 20, 2025

(87) PCT Pub. No.: WO2025/138567

PCT Pub. Date: Jul. 3, 2025

(65) Prior Publication Data

US 2026/0119413 A1 Apr. 30, 2026

(30) Foreign Application Priority Data

Dec. 27, 2023 (CN) ......................... 202311824634.4

(51) Int. Cl.
*G06F 3/00* (2006.01)
*G06F 13/12* (2006.01)

(52) U.S. Cl.
CPC ................................. *G06F 13/126* (2013.01)

(58) Field of Classification Search
None
See application file for complete search history.

(56) References Cited

U.S. PATENT DOCUMENTS 9,542,195 B1 1/2017 Astarabadi et al.
2008/0288767 A1* 11/2008 Wang .................. G06F 11/1417 713/2

(Continued)

FOREIGN PATENT DOCUMENTS

CN 101499044 A 8/2009
CN 104142870 A 11/2014

(Continued)

OTHER PUBLICATIONS

KR10-2025-7021193 Request for the Submission of an Opinion of dated Oct. 30, 2025.
JP2025-537114 Notice of Reasons for Refusal dated Mar. 4, 2026.

*Primary Examiner* — Henry Tsai
*Assistant Examiner* — Dean Phan
(74) *Attorney, Agent, or Firm* — IPro, PLLC

(57) ABSTRACT

The dual basic input/output system (BIOS) system includes: a first BIOS chip, configured to run a first BIOS sub-system; a second BIOS chip, configured to run a second BIOS sub-system; a baseboard management controller (BMC) chip, configured to run a BMC program; a BMC control chip, configured to control the BMC chip and the second BIOS chip, the BMC control chip being connected to the BMC chip and the second BIOS chip; and a platform controller hub, configured to control the first BIOS chip and the BMC control chip, the platform controller hub being connected to the first BIOS chip via a first bus and connected to the BMC control chip via a second bus, the first bus being connected to the second bus, and the platform controller hub being connected to a central processing unit (CPU).

19 Claims, 8 Drawing Sheets

(56) References Cited

U.S. PATENT DOCUMENTS

| | | | | |
|---|---|---|---|---|
| 2014/0040605 | A1 * | 2/2014 | Futral | G06F 9/445 713/2 |
| 2018/0107558 | A1 | 4/2018 | Rahardjo et al. | |
| 2019/0303329 | A1 * | 10/2019 | Lee | G06F 13/4022 |
| 2023/0075055 | A1 * | 3/2023 | Chen | G06F 3/0679 |

FOREIGN PATENT DOCUMENTS

| | | | |
|---|---|---|---|
| CN | 106990958 | A | 7/2017 |
| CN | 108228394 | A | 6/2018 |
| CN | 108427885 | A | 8/2018 |
| CN | 211349235 | U | 8/2020 |
| CN | 111857840 | A | 10/2020 |
| CN | 112084064 | A | 12/2020 |
| CN | 112363867 | A | 2/2021 |
| CN | 113867807 | A | 12/2021 |
| CN | 116450185 | A | 7/2023 |
| CN | 116795437 | A | 9/2023 |
| CN | 117472457 | A | 1/2024 |
| CN | 118227214 | A | 6/2024 |
| JP | 2003316582 | A | 11/2003 |
| JP | 2011145910 | A | 7/2011 |

* cited by examiner

DUAL BIOS SYSTEM, SYSTEM SWITCHING METHOD AND APPARATUS, DEVICE, AND STORAGE MEDIUM

CROSS-REFERENCE TO RELATED APPLICATION

This application claims the priority of the Chinese Patent application filed on Dec. 27, 2023 before the CNIPA, China National Intellectual Property Administration with the application number of 202311824634.4, and the title of "DUAL BIOS SYSTEM, SYSTEM SWITCHING METHOD AND APPARATUS, DEVICE, AND STORAGE MEDIUM", which is incorporated herein in its entirety by reference.

FIELD

Embodiments of the present application relate to the technical field of operating systems, and more particularly, to a dual BIOS system, a system switching method and apparatus, a device, and a non-transitory readable storage medium.

BACKGROUND

In a server system, a basic input/output system (BIOS) chip is responsible for booting the overall system, initializing hardware, and loading an operating system. It also provides some necessary low-level services during running of the system, and plays a vital role in the overall server system.

When the BIOS chip fails, the server system cannot be booted normally and may only be booted again after the BIOS chip is repaired, which will reduce work efficiency of the overall system and cause losses to a user.

SUMMARY

Some embodiments of the present application provide a dual basic input/output system (BIOS) system, a system switching method and apparatus, a device, and a non-transitory readable storage medium, to ensure stable operation of the BIOS system.

In a first aspect, some embodiments of the present application provide a dual BIOS system, which includes:

- a first BIOS chip, configured to run a first BIOS sub-system;
- a second BIOS chip, configured to run a second BIOS sub-system;
- a baseboard management controller (BMC) chip, configured to run a BMC program;
- a BMC control chip, configured to control the BMC chip and the second BIOS chip, the BMC control chip being connected to the BMC chip and the second BIOS chip; and
- a platform controller hub, configured to control the first BIOS chip and the BMC control chip, the platform controller hub being connected to the first BIOS chip via a first bus and connected to the BMC control chip via a second bus, the first bus being connected to the second bus, and the platform controller hub being connected to a central processing unit (CPU).

In some embodiments, an access entity of the dual BIOS system includes a host and the BMC control chip, and the host and the BMC control chip perform interactive access by transmitting instructions.

In some embodiments, after performing sub-system flash on the first BIOS chip, the BMC control chip transmits a sub-system switching request instruction to the host;

- the host switches from the first BIOS sub-system to the second BIOS sub-system in response to the host receiving the sub-system switching request instruction;
- the BMC control chip flashes the second BIOS sub-system on the second BIOS chip in response to a currently running BIOS sub-system being switched from the first BIOS sub-system to the second BIOS sub-system;
- the BMC control chip transmits the sub-system switching request instruction to the host in response to flash of the second BIOS sub-system on the second BIOS chip being completed; and
- the host switches from the second BIOS sub-system to the first BIOS sub-system in response to the host receiving the sub-system switching request instruction.

In some embodiments, after performing sub-system flash on the first BIOS sub-system on the first BIOS chip, the host switches from the first BIOS sub-system to the second BIOS sub-system;

- the host flashes the second BIOS sub-system on the second BIOS chip in response to a currently running BIOS sub-system being switched from the first BIOS sub-system to the second BIOS sub-system; and
- the host switches from the second BIOS sub-system to the first BIOS sub-system in response to flash of the second BIOS sub-system on the second BIOS chip being completed.

In some embodiments, the BMC control chip transmits a sub-system switching request instruction to the host in response to the BMC control chip receiving a sub-system switching instruction; and

- the host switches from the first BIOS sub-system to the second BIOS sub-system in response to the host receiving the sub-system switching request instruction.

In some embodiments, the host switches from the first BIOS sub-system to the second BIOS sub-system in response to the host actively performing sub-system switching.

In some embodiments, the BMC control chip transmits a sub-system switching request instruction to the host in response to the BMC control chip detecting an operating system boot failure; and

- the host switches from the first BIOS sub-system to the second BIOS sub-system in response to the host receiving the sub-system switching request instruction.

In some embodiments, the host reads data from the first BIOS chip in response to the host operating normally;

- the host transmits a data read instruction to the BMC control chip;
- the BMC control chip transmits data from the second BIOS chip to the host in response to the BMC control chip receiving the data read instruction;
- the host performs data check on the data from the first BIOS chip and the data from the second BIOS chip; and
- the host performs data synchronization on the first BIOS chip and the second BIOS chip based on a data check result.

In a second aspect, in some embodiments, the present application provides a system switching method, applied to the dual BIOS system, and including:

- determining whether sub-system switching is required in response to the first BIOS sub-system running;
- determining a switching trigger condition that the dual BIOS system satisfies in response to the sub-system switching is required, the switching trigger condition including: dual BIOS flash triggering, automatic switching triggering, and manual switching triggering;

switching from the first BIOS sub-system currently running to the second BIOS sub-system in a corresponding switching manner based on the switching trigger condition;

acquiring a value of a flag register in response to a currently running BIOS sub-system is switched from the first BIOS sub-system to the second BIOS sub-system;

determining a BIOS sub-system used for data access based on the value of the flag register; and performing the data access by using the BIOS sub-system.

In some embodiments, the switching from the first BIOS sub-system currently running to the second BIOS sub-system in a corresponding switching manner based on the switching trigger condition includes:

determining an execution entity that flashes the first BIOS sub-system in response to the switching trigger condition being the dual BIOS flash triggering;

transmitting, by the BMC control chip, a first switching request to a host in response to the execution entity being the BMC control chip; and switching, by the host, from the first BIOS sub-system to the second BIOS sub-system based on the first switching request.

In some embodiments, before the transmitting, by the BMC control chip, a first switching request to a host, the method further includes:

flashing the first BIOS sub-system through the BMC control chip; and setting the value of the flag register to a second preset value.

In some embodiments, further including:

switching, by the host, from the first BIOS sub-system to the second BIOS sub-system in response to the execution entity being the host.

In some embodiments, before the switching, by the host, from the first BIOS sub-system to the second BIOS sub-system, the method further includes:

flashing, by the host, the first BIOS sub-system; and setting the value of the flag register to a third preset value.

In some embodiments, further including:

receiving, by the BMC control chip, a sub-system switching instruction in response to the switching trigger condition being the manual switching triggering;

transmitting, by the BMC control chip, a second switching request to a host; and switching, by the host, from the first BIOS sub-system to the second BIOS sub-system based on the second switching request.

In some embodiments, further including:

determining an execution entity corresponding to the automatic switching triggering in response to the switching trigger condition being the automatic switching triggering;

transmitting, by the BMC control chip, a third switching request to a host in response to the execution entity is the BMC control chip; and switching, by the host, from the first BIOS sub-system to the second BIOS sub-system based on the third switching request.

In some embodiments, further including:

switching, by the host, from the first BIOS sub-system to the second BIOS sub-system in response to the execution entity being the host.

In some embodiments, the determining a BIOS sub-system used for data access based on the value of the flag register includes:

determining the BIOS sub-system used for the data access as the second BIOS sub-system in response to the value of the flag register being a first preset value;

determining the BIOS sub-system used for the data access as the first BIOS sub-system in response to the value of the flag register being a second preset value; and determining the BIOS sub-system used for the data access as the first BIOS sub-system in response to the value of the flag register being a third preset value.

In some embodiments, further including:

flashing, by the BMC control chip, the second BIOS sub-system in response to the value of the flag register being the second preset value;

transmitting, by the BMC control chip, a fourth switching request to a host in response to flash of the second BIOS sub-system being completed; and switching, by the host, from the second BIOS sub-system to the first BIOS sub-system based on the fourth switching request.

In some embodiments, further including:

flashing, by a host, the second BIOS sub-system in response to the value of the flag register being the third preset value;

switching, by the host, from the second BIOS sub-system to the first BIOS sub-system in response to flash of the second BIOS sub-system being completed; and modifying the value of the flag register to the first preset value.

In some embodiments, further including:

reading system data of the first BIOS sub-system in response to a host operating normally;

reading system data of the second BIOS sub-system;

performing data check on the system data of the first BIOS sub-system and the system data of the second BIOS sub-system; and performing data synchronization on the system data of the first BIOS sub-system and the system data of the second BIOS sub-system based on a data check result.

In some embodiments, the performing data synchronization on the system data of the first BIOS sub-system and the system data of the second BIOS sub-system based on a data check result includes:

synchronously backing up modified parameters to the second BIOS sub-system in response to parameters of the first BIOS sub-system being modified;

writing a reserved configuration into the first BIOS sub-system in response to performing reserved configuration flash on the first BIOS sub-system; and backing up the system data of the first BIOS sub-system to the second BIOS sub-system; or reading the system data of the second BIOS sub-system in response to performing data rollback synchronization on the first BIOS sub-system; and synchronizing the system data of the second BIOS sub-system to the first BIOS sub-system.

In some embodiments, further including:

switching from the first BIOS sub-system to the second BIOS sub-system in response to the host operating abnormally.

In a third aspect, in some embodiments, the present application provides a dual BIOS system, including:

a first BIOS chip, configured to run a first BIOS sub-system;

a second BIOS chip, configured to run a second BIOS sub-system;

a BMC chip, configured to run a BMC program;

a switching chip, configured to control a connection between the first BIOS chip and the second BIOS chip, the switching chip being connected to the first BIOS chip and the second BIOS chip;

a complex programmable logic device, configured to control the switching chip to perform link switching, the complex programmable logic device being connected to the switching chip;

a BMC control chip, configured to control the BMC chip, the BMC control chip being connected to the BMC chip, the complex programmable logic device, and the switching chip; and a platform controller hub, connected to the switching chip via a first bus, connected to the BMC control chip via a second bus, and connected to a CPU, the first bus being connected to the second bus.

In some embodiments, an access entity of the dual BIOS system includes a host and the BMC control chip.

In some embodiments, the BMC control chip transmits a sub-system switching request instruction to the complex programmable logic device in response to the BMC control chip receiving a sub-system switching instruction;

the BMC control chip controls the dual BIOS system to perform a shutdown operation;

the complex programmable logic device transmits a line switching instruction to the switching chip in response to the complex programmable logic device receiving the sub-system switching request instruction;

the switching chip switches a connected chip from the first BIOS chip to the second BIOS chip in response to the switching chip receiving the line switching instruction; and the dual BIOS system uses the second BIOS sub-system for startup and boot.

In some embodiments, the BMC control chip transmits a sub-system switching request instruction to the complex programmable logic device in response to an operating system boot failure;

the BMC control chip controls the dual BIOS system to perform a shutdown operation;

the complex programmable logic device transmits a line switching instruction to the switching chip in response to the complex programmable logic device receiving the sub-system switching request instruction;

the switching chip switches a connected chip from the first BIOS chip to the second BIOS chip in response to the switching chip receiving the line switching instruction; and the dual BIOS system uses the second BIOS sub-system for startup and boot.

In some embodiments, the BMC control chip transmits a sub-system switching request instruction to the complex programmable logic device in response to sub-system flash is required to be performed on the dual BIOS system;

the BMC control chip controls the dual BIOS system to perform a shutdown operation;

the complex programmable logic device transmits a first line switching instruction to the switching chip in response to the complex programmable logic device receiving the sub-system switching request instruction;

the switching chip switches a connected chip from the first BIOS chip to the second BIOS chip in response to the switching chip receiving the first line switching instruction;

the complex programmable logic device transmits a second line switching instruction to the switching chip;

the switching chip switches the access entity from the host to the BMC control chip in response to the switching chip receiving the second line switching instruction;

the BMC control chip flashes the second BIOS sub-system on the second BIOS chip;

the BMC control chip transmits a sub-system switching request instruction to the complex programmable logic device in response to flash of the second BIOS sub-system on the second BIOS chip being completed;

the complex programmable logic device transmits a third line switching instruction to the switching chip in response to the complex programmable logic device receiving the sub-system switching request instruction;

the switching chip switches the connected chip from the second BIOS chip to the first BIOS chip in response to the switching chip receiving the third line switching instruction;

the BMC control chip flashes the first BIOS sub-system on the first BIOS chip;

the complex programmable logic device transmits a fourth line switching instruction to the switching chip in response to flash of the first BIOS sub-system on the first BIOS chip being completed;

the switching chip switches the access entity from the BMC control chip to the host in response to the switching chip receiving the fourth line switching instruction; and the dual BIOS system uses the first BIOS sub-system for startup and boot.

In a fourth aspect, in some embodiments, the present application provides a system switching method, applied to the dual BIOS system, and including:

determining a switching trigger condition that the dual BIOS system satisfies in response to the first BIOS sub-system running, the switching trigger condition including: manual switching triggering, automatic switching triggering, and dual BIOS flash triggering; and performing a corresponding sub-system switching process based on the switching trigger condition.

In some embodiments, the performing a corresponding sub-system switching process based on the switching trigger condition includes:

controlling, by the complex programmable logic device, the switching chip to switch from the first BIOS sub-system to the second BIOS sub-system in response to the switching trigger condition being the manual switching triggering;

controlling, by the BMC control chip, the dual BIOS system to perform a shutdown operation;

determining a value of a flag register; and using the second BIOS sub-system for startup and boot in response to the value of the flag register being not a first preset value.

In some embodiments, further including:

transmitting, by the BMC control chip, a sub-system switching request instruction to the complex programmable logic device in response to the switching trigger condition being the automatic switching triggering;

controlling, by the BMC control chip, the dual BIOS system to perform the shutdown operation;

controlling the switching chip to switch from the first BIOS sub-system to the second BIOS sub-system in response to the complex programmable logic device receiving the sub-system switching request instruction;

determining the value of the flag register; and using the second BIOS sub-system for startup and boot in response to the value of the flag register being not the first preset value.

In some embodiments, further including:

setting the value of the flag register to the first preset value in response to the switching trigger condition being the dual BIOS flash triggering;

transmitting, by the BMC control chip, the sub-system switching request instruction to the complex programmable logic device;

controlling, by the BMC control chip, the dual BIOS system to perform the shutdown operation;

controlling, by the complex programmable logic device, the switching chip to switch from the first BIOS sub-system to the second BIOS sub-system;

acquiring the value of the flag register;

controlling, by the complex programmable logic device, the switching chip to switch an access entity of the dual BIOS system from a host to the BMC control chip in response to the value of the flag register being the first preset value;

flashing, by the BMC control chip, the second BIOS sub-system;

transmitting, by the BMC control chip, the sub-system switching request instruction to the complex programmable logic device in response to flash of the second BIOS sub-system being completed;

controlling the switching chip to switch from the second BIOS sub-system to the first BIOS sub-system in response to the complex programmable logic device receiving the sub-system switching request instruction;

flashing, by the BMC control chip, the first BIOS sub-system;

clearing the value of the flag register in response to flash of the first BIOS sub-system being completed;

controlling, by the complex programmable logic device, the switching chip to switch the access entity of the dual BIOS system from the BMC control chip to the host; and using, by the dual BIOS system, the first BIOS sub-system for startup and boot.

In a fifth aspect, in some embodiments, the present application provides a system switching apparatus, including:

a switching determination module, configured to determine whether sub-system switching is required in response to a first BIOS sub-system running;

a switching trigger condition determination module, configured to determine a switching trigger condition that a dual BIOS system satisfies in response to sub-system switching being required, the switching trigger condition including: dual BIOS flash triggering, automatic switching triggering, and manual switching triggering;

a sub-system switching module, configured to switch from the first BIOS sub-system currently running to a second BIOS sub-system in a corresponding switching manner based on the switching trigger condition;

a value acquisition module, configured to acquire a value of a flag register in response to a currently running BIOS sub-system being switched from the first BIOS sub-system to the second BIOS sub-system;

a sub-system determination module, configured to determine a BIOS sub-system for data access based on the value of the flag register; and a data access module, configured to perform data access by using the BIOS sub-system.

In some embodiments, the sub-system switching module includes:

a first execution entity determination sub-module, configured to determine an execution entity that flashes the first BIOS sub-system in response to the switching trigger condition being the dual BIOS flash triggering;

a first transmission sub-module, configured to transmit a first switching request to a host through a BMC control chip in response to the execution entity being the BMC control chip; and a first switching sub-module, configured to switch from the first BIOS sub-system to the second BIOS sub-system through the host based on the first switching request.

In some embodiments, the apparatus further includes:

a first data flashing sub-module, configured to flash the first BIOS sub-system through the BMC control chip; and a first register value setting sub-module, configured to set the value of the flag register to a second preset value.

In some embodiments, the apparatus further includes:

a second switching sub-module, configured to switch from the first BIOS sub-system to the second BIOS sub-system through the host in response to the execution entity being the host.

In some embodiments, the apparatus further includes:

a second data flashing sub-module, configured to flash the first BIOS sub-system through the host; and a second register value setting sub-module, configured to set the value of the flag register to a third preset value.

In some embodiments, the apparatus further includes:

a first receiving sub-module, configured to receive a sub-system switching instruction through the BMC control chip in response to the switching trigger condition being the manual switching triggering;

a second transmission sub-module, configured to transmit a second switching request to the host through the BMC control chip; and a third sub-system switching sub-module, configured to switch from the first BIOS sub-system to the second BIOS sub-system through the host based on the second switching request.

In some embodiments, the apparatus further includes:

a second execution entity determination sub-module, configured to determine an execution entity corresponding to the automatic switching triggering in response to the switching trigger condition being the automatic switching triggering;

a third transmission sub-module, configured to transmit a third switching request to the host through the BMC control chip in response to the execution entity being the BMC control chip; and a third switching sub-module, configured to switch from the first BIOS sub-system to the second BIOS sub-system through the host based on the third switching request.

In some embodiments, the apparatus further includes:

a fourth switching sub-module, configured to switch from the first BIOS sub-system to the second BIOS sub-system through the host in response to the execution entity being the host.

In some embodiments, the sub-system determination module includes:

a first sub-system determination sub-module, configured to determine the BIOS sub-system used for the data access as the second BIOS sub-system in response to the value of the flag register being a first preset value;

a second sub-system determination sub-module, configured to determine the BIOS sub-system used for the data access as the first BIOS sub-system in response to the value of the flag register being the second preset value; and a third sub-system determination sub-module, configured to determine the BIOS sub-system used for the data access as the first BIOS sub-system as the BIOS sub-system for data access in response to the value of the flag register being the third preset value.

In some embodiments, the apparatus further includes:

a third data flashing sub-module, configured to flash the second BIOS sub-system through the BMC control chip in response to the value of the flag register being the second preset value;

a fourth transmission sub-module, configured to transmit a fourth switching request to the host through the BMC control chip in response to flash of the second BIOS sub-system being completed; and a fourth switching sub-module, configured to switch from the second BIOS sub-system to the first BIOS sub-system through the host based on the fourth switching request.

In some embodiments, the apparatus further includes:

a fourth data flashing sub-module, configured to flash the second BIOS sub-system through the host in response to the value of the flag register being the third preset value;

a fifth switching sub-module, configured to switch from the second BIOS sub-system to the first BIOS sub-system through the host in response to flash of the second BIOS sub-system being completed; and a third register value setting sub-module, configured to modify the value of the flag register to the first preset value.

In some embodiments, the apparatus further includes:

a first data reading module, configured to read system data of the first BIOS sub-system in response to the host operating normally;

a second data reading module, configured to read system data of the second BIOS sub-system;

a data check module, configured to perform data check on the system data of the first BIOS sub-system and the system data of the second BIOS sub-system; and a data synchronization module, configured to perform data synchronization on the system data of the first BIOS sub-system and the system data of the second BIOS sub-system based on a data check result.

In some embodiments, the data synchronization module includes:

a first data synchronization sub-module, configured to synchronously back up modified parameters to the second BIOS sub-system in response to parameters of the first BIOS sub-system being modified;

a data writing sub-module, configured to write a reserved configuration into the first BIOS sub-system in response to performing reserved configuration flash on the first BIOS sub-system;

a second data synchronization sub-module, configured to back up the system data of the first BIOS sub-system to the second BIOS sub-system;

a third data synchronization sub-module, configured to read the system data of the second BIOS sub-system in response to performing data rollback synchronization on the first BIOS sub-system; and a fourth data synchronization sub-module, configured to synchronize the system data of the second BIOS sub-system to the first BIOS sub-system.

In some embodiments, the apparatus further includes:

a second sub-system switching module, configured to switch from the first BIOS sub-system to the second BIOS sub-system in response to the host operating abnormally.

In a sixth aspect, in some embodiments, the present application provides a system switching apparatus, including:

a switching trigger condition determination module, configured to determine a switching trigger condition that a dual BIOS system satisfies in response to a first BIOS sub-system running, the switching trigger condition including: manual switching triggering, automatic switching triggering, and dual BIOS flash triggering; and a sub-system switching module, configured to perform a corresponding sub-system switching process based on the switching trigger condition.

In some embodiments, the sub-system switching module includes:

a manual switching sub-module, configured to control the switching chip through the complex programmable logic device to switch from the first BIOS sub-system to the second BIOS sub-system in response to the switching trigger condition being the manual switching triggering;

a first shutdown operation sub-module, configured to control the dual BIOS system through a BMC control chip to perform a shutdown operation;

a first data determination sub-module, configured to determine a current value of a flag register; and a first startup and boot sub-module, configured to use the second BIOS sub-system for startup and boot in response to the value of the flag register being not a first preset value.

In some embodiments, the sub-system switching module further includes:

an automatic switching sub-module, configured to transmit a sub-system switching request instruction to the complex programmable logic device through the BMC control chip in response to the switching trigger condition being the automatic switching triggering;

a second shutdown operation sub-module, configured to control the dual BIOS system through the BMC control chip to perform the shutdown operation;

an automatic switching performing sub-module, configured to control the switching chip to switch from the first BIOS sub-system to the second BIOS sub-system in response to the complex programmable logic device receiving the sub-system switching request instruction;

a second value determination sub-module, configured to determine the current value of the flag register; and a second startup and boot sub-module, configured to use the second BIOS sub-system for startup and boot in response to the value of the flag register being not the first preset value.

In some embodiments, the sub-system switching module further includes:

a value setting sub-module, configured to set the value of the flag register to the first preset value in response to the switching trigger condition being the dual BIOS flash triggering;

a first instruction transmission sub-module, configured to transmit the sub-system switching request instruction to the complex programmable logic device through the BMC control chip;

a third shutdown operation sub-module, configured to control the dual BIOS system through the BMC control chip to perform the shutdown operation;

a first flash switching performing sub-module, configured to control the switching chip through the complex programmable logic device to switch from the first BIOS sub-system to the second BIOS sub-system;

a third value determination sub-module, configured to acquire the value of the flag register;

an access entity switching sub-module, configured to control the switching chip through the complex programmable logic device to switch an access entity of the dual BIOS system from a host to the BMC control chip in response to the value of the flag register being the first preset value;

a first sub-system flashing sub-module, configured to flash the second BIOS sub-system through the BMC control chip;

a second instruction transmission sub-module, configured to transmit a sub-system switching request instruction to the complex programmable logic device through the BMC control chip in response to flash of the second BIOS sub-system being completed;

a second flash switching performing sub-module, configured to control the switching chip to switch from the second BIOS sub-system to the first BIOS sub-system in response to the complex programmable logic device receiving the sub-system switching request instruction;

a second sub-system flashing sub-module, configured to flash the first BIOS sub-system through the BMC control chip;

a value clearing sub-module, configured to clear the value of the flag register in response to flash of the first BIOS sub-system being completed;

a second access entity switching sub-module, configured to control the switching chip through the complex programmable logic device to switch the access entity of the dual BIOS system from the BMC control chip to the host; and a third startup and boot sub-module, configured to use the first BIOS sub-system of the dual BIOS system for startup and boot.

In a seventh aspect, in some embodiments, the present application provides a non-transitory computer-readable storage medium, having a computer program stored therein, wherein the computer program, when executed by a processor, implements the steps in the method according to the first aspect of the present application.

In an eighth aspect, in some embodiments, the present application provides an electronic device, including a memory, a processor, and a computer program stored in the memory and running on the processor, wherein the computer program, when executed by the processor, implements the steps in the method according to the first aspect of the present application.

A dual BIOS system provided in the present application is adopted, which includes: a first BIOS chip, configured to run a first BIOS sub-system;

a second BIOS chip, configured to run a second BIOS sub-system;

a BMC chip, configured to run a BMC program; a BMC control chip, configured to control the BMC chip and the second BIOS chip, the BMC control chip being connected to the BMC chip and the second BIOS chip; a platform controller hub, configured to control the first BIOS chip and the BMC control chip, the platform controller hub being connected to the first BIOS chip via a first bus and connected to the BMC control chip via a second bus, the first bus being connected to the second bus, and the platform controller hub being connected to a CPU. In this system, the platform controller hub is connected to the first BIOS chip via the first bus, namely, a serial peripheral interface (SPI), and is connected to the second BIOS chip via the second bus, namely, an enhanced serial peripheral interface (ESPI). The ESPI is connected to the SPI. The host controls the first BIOS chip connected via the SPI, and the BMC control chip controls the second BIOS chip. The host side may access the second BIOS chip controlled by the BMC control chip through an ESPI instruction, and the BMC control chip may access the first BIOS chip on the host side through an ESPI request. According to the requirements of the host and the BMC for accessing the first BIOS chip and the second BIOS chip, by utilizing a flash access channel and a sharing function of the ESPI, the host and BMC enable flash access links in respective directions in response to the conditions being satisfied, and may also support data synchronization. This system does not rely on a complex programmable logic device and a switching chip, thereby reducing costs of an architecture and improving sub-system switching efficiency of the dual BIO system.

According to the system switching method provided in the present application, in response to the first BIOS sub-system running, whether sub-system switching is required is determined; in response to sub-system switching is required, the switching trigger condition that the dual BIOS system satisfies is determined, the switching trigger condition including: the dual BIOS flash triggering, the automatic switching triggering, and the manual switching triggering; the currently running BIOS sub-system is switched from the first BIOS sub-system to the second BIOS sub-system in the corresponding switching manner according to the switching trigger condition; in response to the currently running BIOS sub-system being switched from the first BIOS sub-system to the second BIOS sub-system, the value of the flag register is acquired; the BIOS sub-system for data access is determined according to the value of the flag register; and data access is performed by using the BIOS sub-system. In this method, in response to switching from the currently running first BIOS sub-system is required, the switching trigger condition that the dual BIOS system satisfies is determined, and the currently running BIOS sub-system is switched from the first BIOS sub-system to the second BIOS sub-system in the corresponding manner according to the switching trigger condition. In this way, a plurality of cases where sub-system switching is required are taken into account, which ensures rapid switching from one BIOS sub-system to the other BIOS sub-system in a case that the one BIOS sub-system fails during boot and running of an operating system, and further ensures stable running of the operating system.

BRIEF DESCRIPTION OF THE DRAWINGS

In order to more clearly illustrate the technical solutions of some embodiments of the present application, a brief introduction will be given to the accompanying drawings required for the description of some embodiments of the present application. It is obvious that the accompanying drawings in the following description are only some embodiments of the present application. For those skilled in the art, other drawings may be obtained based on these drawings without creative work.

DETAILED DESCRIPTION

The following will provide a clear and complete description of the technical solutions in some embodiments of the present application, based on the accompanying drawings. Obviously, the described embodiments are part of embodiments of the present application and not all of them. Based on some embodiments in the present application, all other embodiments obtained by persons skilled in the art without creative labor are within the scope of protection of the present application.

For ease of understanding, the following terms involved in some embodiments of the present application are explained:

enhanced serial peripheral interface (ESPI);
central processing unit (CPU);
basic input/output system (BIOS);
baseboard management controller (BMC);
serial peripheral interface (SPI);
platform controller hub (PCH);
complex programmable logic device (CPLD); and
switching chip (switch).

Figure 1:
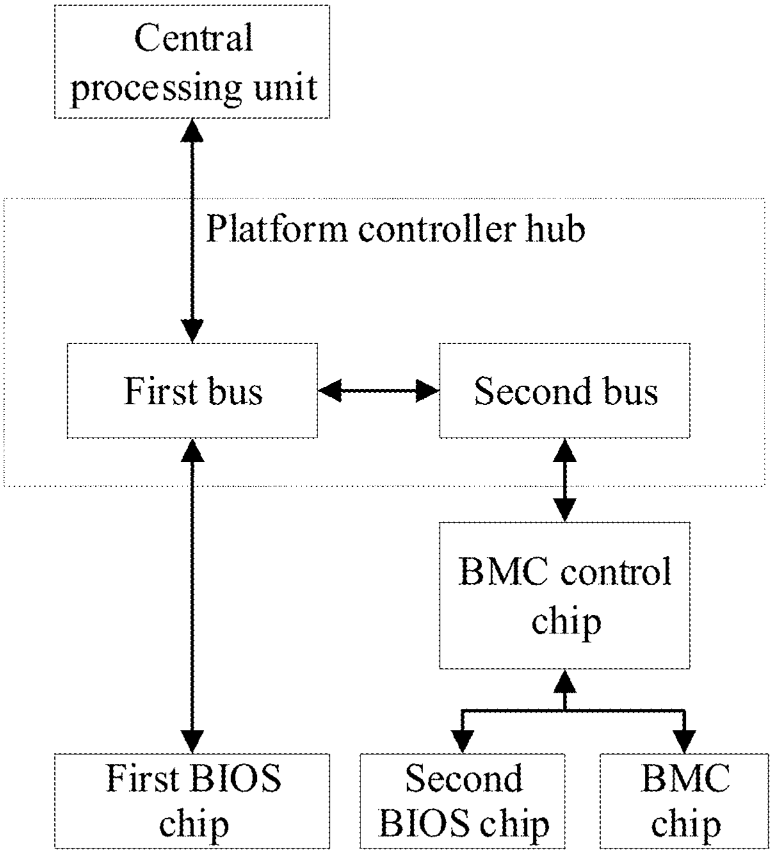
FIG. 1 is a schematic structural diagram of a dual basic input output system (BIOS) system according to some embodiments of the present application.

Refer to FIG. 1. FIG. 1 is a schematic structural diagram of a dual basic input/output system (BIOS) system proposed in some embodiments of the present application. As shown in FIG. 1, the system includes:

a first BIOS chip, configured to run a first BIOS sub-system.

In some embodiments of the present application, the first BIOS sub-system runs on the BIOS chip. The BIOS system is a set of programs that run during boot of an operating system, and stores the most important basic input/output program of a computer and a bootstrapping program of the system, and is mainly configured to provide the lowest-level and most direct hardware configuration and control for the computer. The first BIOS chip is one BIOS chip in the dual BIOS system, and the first BIOS sub-system is one BIOS system running on the first BIOS chip.

The dual BIOS system further includes a second BIOS chip, configured to run a second BIOS sub-system.

In some embodiments of the present application, the second BIOS chip is the other BIOS chip in the dual BIOS system, and the second BIOS sub-system is the other BIOS system running on the second BIOS chip.

In some embodiments of the present application, the first BIOS sub-system and the second BIOS sub-system run independently of each other, and data stored in the first BIOS chip and the second BIOS chip is the same and synchronously updated in real time.

The dual BIOS system further includes a BMC chip, configured to run a BMC program.

In some embodiments of the present application, the BMC chip is configured to run the BMC program. A BMC is a device independent of a server, and may manage server information, such as a model and a manufacturing date of the server, monitor and manage a server status, such as a status of the server and a hard disk status of the server, remotely control and manage the server, such as startup, shutdown, and restart of the server, and maintain and management the server, such as log management, user management, BIOS management, and alarm management.

The dual BIOS system further includes a BMC control chip, configured to control the BMC chip and the second BIOS chip, the BMC control chip being connected to the BMC chip and the second BIOS chip.

In some embodiments of the present application, the BMC control chip is configured to control operation of the BMC chip, issue an instruction to the BMC chip, and transmit a request to a host side. The BMC control chip is connected to the BMC chip and the second BIOS chip.

The dual BIOS system further includes a platform controller hub, configured to control the first BIOS chip and the BMC control chip, the platform controller hub being connected to the first BIOS chip via a first bus and connected to the BMC control chip via a second bus, the first bus being connected to the second bus, the platform controller hub being connected to a central processing unit (CPU).

In some embodiments of the present application, the platform controller hub is configured to control the first BIOS chip and the BMC control chip. The platform controller hub is configured with the first bus (namely, a serial peripheral interface (SPI)) and the second bus (namely, enhanced serial peripheral interface (ESPI)), and respectively manages and controls the two interfaces by using an SPI control program and an ESPI control program. The platform controller hub is connected to the first BIOS chip via the SPI and connected to the BMC control chip via the ESPI. The other end of the platform controller hub is further connected to the CPU. On the platform controller hub, the ESPI is connected to the SPI. The SPI is a high-speed serial bus interface, and the ESPI is the other high-speed serial bus interface that is extended based on the SPI. The ESPI will call some functions of the SPI during operation. The SPI is connected to the ESPI, to implement mutual data transmission and access.

In some embodiments of the present application, an access entity of the dual BIOS system includes a host and the BMC control chip. The host and the BMC control perform interactive access by transmitting instructions using a data transmission protocol of the ESPI.

In some embodiments of the present application, the host is composed of a link that is, CPU-SPI-first BIOS chip, and thus may be referred to as the host of the dual BIOS system. The BMC control chip and the host server as two independent access entities and perform interactive access by transmitting instructions using the data transmission protocol of the ESPI.

In some embodiments of the present application, the two entities may access respective connected BIOS chips. When needing to access the second BIOS chip connected to the BMC, the host transmits an ESPI instruction to the BMC by using the data transmission protocol of the ESPI for interaction, to enable a chip access function of the BMC. Subsequently, the host may perform read/write access on firmware content in the second BIOS chip by using an SPI data transmission protocol compatible with the ESPI. When needing to access the first BIOS chip connected to the host, the BMC transmits an ESPI request to the host, and then the host transmits an ESPI instruction to the BMC for interaction, to enable a chip access function of the host. Subsequently, the BMC may perform read/write access on firmware content in the first BIOS chip by using the SPI data transmission protocol compatible with the ESPI.

In some embodiments of the present application, the ESPI-based dual BIOS system is proposed. The first BIOS chip is directly connected to the SPI on the platform controller hub of the server system, and the second BIOS chip is connected to the BMC control chip and further connected to the ESPI on the platform controller hub via the BMC control chip. Then, content in the two BIOS chips is interactively accessed and read/written by using the data transmission protocol of the ESPI and the data transmission protocol compatible with the SPI and the ESPI. Based on the physical architecture, the functional logic and implementation solutions of the dual BIOS system and the sub-systems thereof are established. Through the solutions, sub-system switching of the dual BIOS system is optimized and improved, to reduce costs of the architecture and improve switching efficiency of the sub-systems.

The access entity of the dual BIOS system includes the host and the BMC control chip. The host and the BMC control chip perform interactive access by transmitting instructions.

After performing system flash on the first BIOS chip, the BMC control chip transmits a sub-system switching request instruction to the host.

In some embodiments of the present application, the sub-system switching request instruction is an instruction transmitted by the BMC control chip to the host, and is configured for requesting the host to perform sub-system switching.

In response to the host receiving the sub-system switching request instruction, the host performs a sub-system switching operation, to switch from the first BIOS sub-system to the second BIOS sub-system.

In response to sub-system switching being completed, the BMC control chip performs sub-system flash on the second BIOS chip.

In response to flash of the second BIOS sub-system on the second BIOS chip being completed, the BMC control chip transmits a sub-system switching request instruction to the host.

In response to the host receiving the sub-system switching request instruction, the host performs a sub-system switching operation, to switch from the second BIOS sub-system to the first BIOS sub-system.

After flashing the first BIOS sub-system on the first BIOS chip, the host performs a sub-system switching operation, to switch from the first BIOS sub-system to the second BIOS sub-system.

In response to sub-system switching being completed, the host performs sub-system flash on the second BIOS chip.

In response to flash of the second BIOS sub-system being completed, the host performs a sub-system switching operation, to switch from the second BIOS sub-system to the first BIOS sub-system.

In response to the BMC control chip receiving the sub-system switching instruction, the BMC transmits a sub-system switching request instruction to the host.

In response to the host receiving the sub-system switching request instruction, the host performs a sub-system switching operation, to switch from the first BIOS sub-system to the second BIOS sub-system.

In response to the host needing to actively perform sub-system switching, the host performs a sub-system switching operation, to switch from the first BIOS sub-system to the second BIOS sub-system.

In response to the BMC detecting a system boot failure, the BMC transmits a sub-system switching request instruction; and In response to the host receiving the sub-system switching request instruction, the host performs a sub-system switching operation, to switch from the first BIOS sub-system to the second BIOS sub-system.

In response to the host operating normally, the host reads data from the first BIOS chip.

The host transmits a data read instruction to the BMC control chip.

In response to the BMC control chip receiving the data read instruction, the BMC control chip transmits data in the second BIOS chip to the host.

The host performs data check on the data from the first BIOS data and the data from the second BIOS chip.

Data synchronization is performed on the first BIOS chip and the second BIOS chip according to a data check result.

Figure 2:
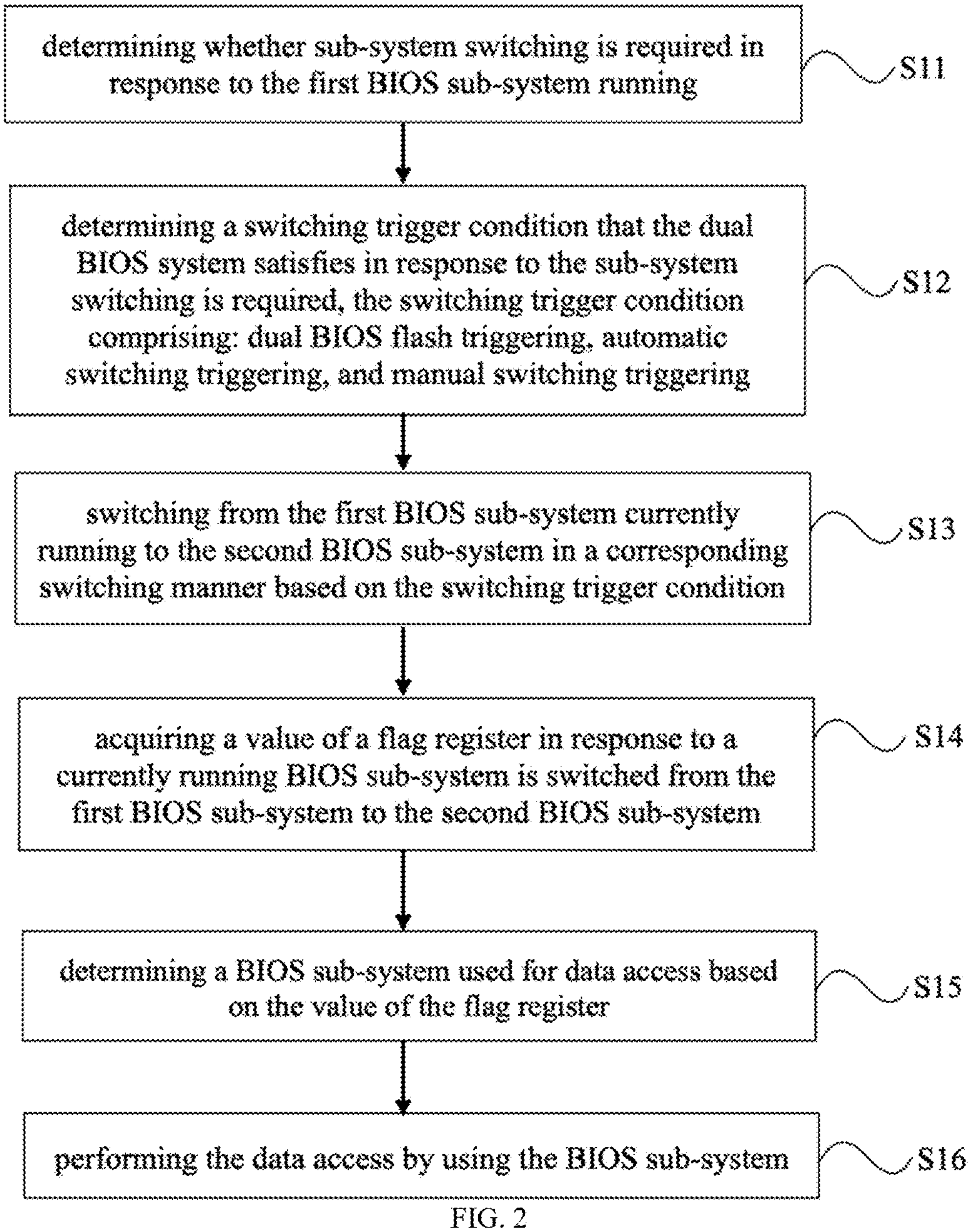
FIG. 2 is a flowchart of a system switching method according to some embodiments of the present application.

Refer to FIG. 2. FIG. 2 is a flowchart of a system switching method proposed in some embodiments of the present application. The method is applied to a dual BIOS system. As shown in FIG. 2, the method includes the following steps.

S11: determining whether sub-system switching is required in response to the first BIOS sub-system running.

Figure 3:
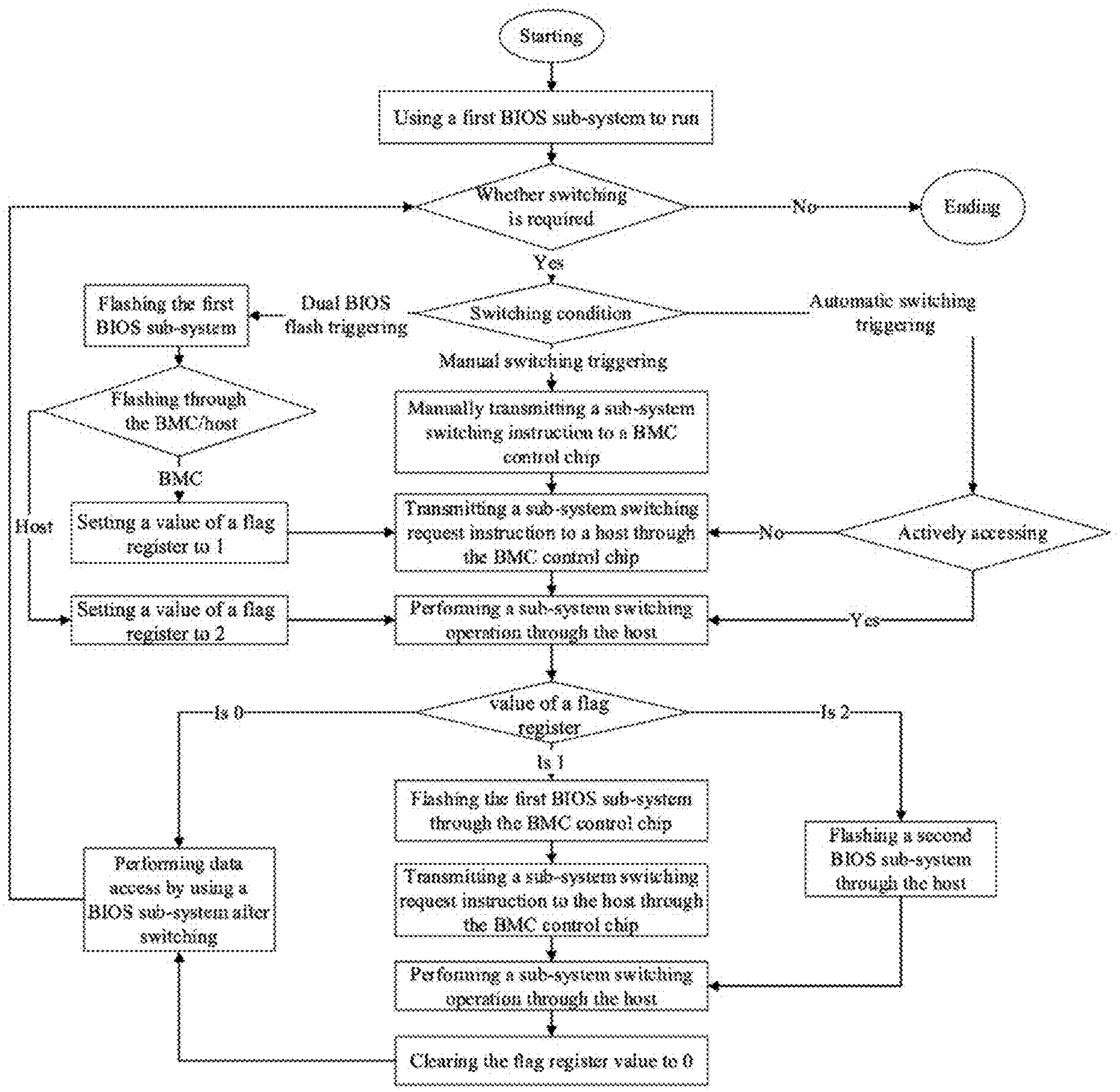
FIG. 3 is a schematic diagram of a switching process of a dual BIOS system according to some embodiments of the present application.

In some embodiments of the present application, referring to FIG. 3, FIG. 3 is a schematic diagram of a system switching process of a dual BIOS system proposed in some embodiments of the present application, when the first BIOS sub-system of the dual BIOS system is running, whether sub-system switching is required to be performed on the dual BIOS system. When the system receives a switching request from the outside, the host actively transmits a switching instruction, or the BMC requests switching, sub-system switching is required. When the system is running normally and neither the outside nor the access entity transmits a switching instruction or a switching request, sub-system switching is not required.

S12: determining a switching trigger condition that a dual BIOS system satisfies in response to the sub-system switching is required, the switching trigger condition including: dual BIOS flash triggering, automatic switching triggering, and manual switching triggering.

In some embodiments of the present application, the switching trigger condition is a condition for triggering the sub-system switching in the dual BIOS system, and includes the dual BIOS flash triggering, the automatic switching triggering, and the manual switching triggering. The dual BIOS flash triggering refers to that during running of a BIOS, after one BIOS sub-system is flashed, the other BIOS sub-system needs to be flashed synchronously. In this case, switching from the one BIOS sub-system to the other BIOS sub-system needs to be performed and then the other BIOS sub-system is flashed, which satisfies the dual BIOS flash triggering. The automatic switching triggering refers to that when the BMC or the host detects a system failure and BIOS sub-system switching is required, the host initiates switching or the BMC requests the host to perform sub-system switching, which satisfies the automatic switching triggering. The manual switching triggering refers to that when requiring BIOS sub-system switching, a user manually transmits a sub-system switching instruction to the BMC, which satisfies the manual switching triggering.

In some embodiments, as shown in FIG. 3, it is assumed that a currently running BIOS system is the first BIOS sub-system and switching from the currently running first BIOS sub-system is required, the switching trigger condition that the dual BIOS system satisfies needs to be first determined.

Exemplarily, when a sub-system switching instruction transmitted by an administrator is received, it is determined that the manual switching triggering is satisfied. When the host detects a system failure and actively initiates sub-system switching, it is determined that the automatic switching triggering is satisfied. When the host or the BMC flashes the BIOS sub-system, it is determined that the dual BIOS flash triggering is satisfied.

S13: switching from the first BIOS sub-system currently running to the second BIOS sub-system in a corresponding switching manner based on the trigger condition.

In some embodiments of the present application, system switching manners corresponding to the trigger conditions are different. After the trigger condition is determined, switching form the first BIOS sub-system currently running to the second BIOS sub-system is performed in the corresponding switching manner.

In some embodiments of the present application, the switching from the first BIOS sub-system currently running to the second BIOS sub-system in a corresponding switching manner based on the trigger condition includes the following steps.

S13-1: determining an execution entity that flashes the first BIOS sub-system in response to the switching trigger condition being the dual BIOS flash triggering.

In some embodiments of the present application, as shown in FIG. 3, in a case that the switching trigger condition is the dual BIOS flash triggering, the execution entity that flashes the first BIOS sub-system is first determined.

In some embodiments of the present application, the system switching manner when the execution entity being the host is different from the system switching manner when the execution entity being the BMC control chip. Therefore, the execution entity that flashes the BIOS sub-system needs to be first determined. After the execution entity flashes the first BIOS sub-system, it is switched to the second BIOS sub-system, and the second BIOS sub-system is flashed.

S13-2: transmitting, by the BMC control chip, a first switching request to the host in response to the execution entity being the BMC control chip.

In some embodiments of the present application, the first switching request is an ESPI request instruction based on an ESPI protocol, and is transmitted by the BMC control chip to the host.

In some embodiments of the present application, when the execution body is the BMC control chip, after the BMC control chip flashes the first BIOS sub-system, the second BIOS sub-system needs to be flashed synchronously, to ensure that data in the second BIOS sub-system is identical to data in the current first BIOS sub-system. In this case, an ESPI request instruction is transmitted to the host through the BMC control chip for requesting BIOS sub-system switching.

S13-3: switching, by the host, from the first BIOS sub-system to the second BIOS sub-system based on the first switching request.

In some embodiments of the present application, after receiving the first switching request, the host performs a BIOS sub-system switching operation in response to the request transmitted by the BMC, transmits an ESPI instruction to the BMC, and switches a sub-system that is in the dual BIOS system and that is currently selected for data access from the first BIOS sub-system to the second BIOS sub-system.

In some embodiments of the present application, after switching from the first BIOS sub-system to the second BIOS sub-system is performed, the host and the BMC both perform data access by using the second BIOS sub-system.

In some embodiments of the present application, the method further includes the following step.

S13-4: switching, by the host, from the first BIOS sub-system to the second BIOS sub-system in response to the execution entity being the host.

In some embodiments of the present application, when the execution entity is the host, an ESPI instruction is directly transmitted to the BMC through the host, and a BIOS access switching operation is performed. After the operation is performed, the host and the BMC both perform data access by using the second BIOS sub-system.

In some embodiments of the present application, the method further includes the following steps.

S13-5: receiving, by the BMC control chip, a sub-system switching instruction in response to the switching trigger condition being the manual switching triggering.

In some embodiments of the present application, the sub-system switching instruction is an instruction transmitted by an administrator to the BMC control chip and is configured for instructing the BMC control chip to perform sub-system switching.

In some embodiments of the present application, when the trigger condition is the manual switching triggering, the sub-system switching instruction is received through the BMC control chip, and the administrator may control the overall system through the BMC.

S13-6: transmitting, by the BMC control chip, a second switching request to the host.

In some embodiments of the present application, the second switching request is transmitted by the BMC control chip to the host and is a corresponding request generated after the BMC control chip receives a first switching instruction.

In some embodiments of the present application, when receiving the sub-system switching instruction, the BMC control chip transmits the second switching request to the host.

S13-7: switching, by the host, from the first BIOS sub-system to second BIOS sub-system based on the second switching request.

In some embodiments of the present application, after receiving the second switching request, the host transmits an ESPI instruction to the BMC control chip in response to the second switching request, and performs a BIOS chip switching operation, to switch a sub-system selected by the host and the BMC for data access from the first BIOS sub-system to the second BIOS sub-system.

In some embodiments of the present application, the method further includes the following step.

S13-8: determining an execution entity corresponding to the automatic switching triggering in response to the switching trigger condition being the automatic switching triggering.

In some embodiments of the present application, when the trigger condition is the automatic switching triggering, the execution entity that performs an automatic switching trigger operation is determined.

S13-9: transmitting, by the BMC control chip, a third switching request to the host in response to the execution entity being the BMC control chip.

In some embodiments of the present application, the third switching request is transmitted by the BMC control chip to the host and is a switching request automatically transmitted when the BMC control chip detects a server failure.

In some embodiments of the present application, when the execution entity is the BMC control chip, the BMC entity will automatically initiate a switch access to the BIOS chip after detecting an issue such as server downtime, and the third switching request is transmitted to the host through the BMC control chip.

S13-10: switching, by the host, from the first BIOS sub-system to the second BIOS sub-system based on the third switching request.

In some embodiments of the present application, after receiving the third switching request, the host transmits an ESPI instruction to the BMC control chip in response to the request, and performs a BIOS switching operation, to switch from the first BIOS sub-system currently running in the system to the second BIOS sub-system.

In some embodiments of the present application, the method further includes:

S13-11: switching, by the host, from the first BIOS sub-system to the second BIOS sub-system in response to the execution entity being the host.

In some embodiments of the present application, when the execution entity is the host, that is, the host actively wants to switch the BIOS chip for data access, the host directly transmits an ESPI instruction to the BMC control chip, and performs a BIOS sub-system switching operation, to switch the sub-system for data access from the first BIOS sub-system to the second BIOS sub-system.

S14: acquiring a current value of a flag register.

In some embodiments of the present application, as shown in FIG. 3, after sub-system switching of the dual BIOS system is completed, that is, a currently running system is switched from the first BIOS sub-system to the second BIOS sub-system, the current value of the flag register is acquired.

S15: determining a BIOS sub-system for data access according to the value of the flag register.

In some embodiments of the present application, the determining a BIOS sub-system for data access according to the value of the flag register includes the following steps:

S15-1: determining the BIOS sub-system used for data access as the second BIOS sub-system in response to the value of the flag register being a first preset value.

In some embodiments of the present application, the first preset value is a default value of the flag register.

In some embodiments of the present application, when the value of the flag register is the first preset value, it indicates that the value of the flag register is not modified, that is, sub-system switching is not triggered by flashing the dual BIOS system. Therefore, the BIOS sub-system used for data access is determined as the second BIOS sub-system, and the second BIOS sub-system is directly used for data access.

Exemplarily, the first preset value is 0.

S15-2: determining the BIOS sub-system used for data access as the first BIOS sub-system in response to the value of the flag register being a second preset value.

In some embodiments of the present application, when the value of the flag register is the second preset value, it indicates that sub-system switching is performed when the BMC flashes the first BIOS sub-system. In this case, the BIOS sub-system used for data access is determined as the first BIOS sub-system.

S15-3: determining the BIOS sub-system used for data access as the first BIOS sub-system in response to the value of the flag register being a third preset value.

In some embodiments of the present application, when the value of the flag register is the third preset value, it indicates that sub-system switching is performed when the host flashes the first BIOS sub-system. In this case, the BIOS sub-system used for data access is determined as the first BIOS sub-system.

In some other embodiments of the present application, the method further includes:

S15-4: flashing, by the BMC control chip, the second BIOS sub-system in response to the value of the flag register being the second preset value.

In some embodiments of the present application, as shown in FIG. 3, when the value of the flag register is the second preset value, the second BIOS sub-system is flashed through the BMC control chip.

S15-5: transmitting, by the BMC control chip, a fourth switching request in response to flash of the second BIOS sub-system being completed.

In some embodiments of the present application, the fourth switching request is transmitted by the BMC control chip to the host and is a request generated after flash of the second BIOS sub-system is completed.

In some embodiments of the present application, after the flash of the second BIOS sub-system is completed, the BMC control chip transmits the fourth switching request to the host.

S15-6: switching, by the host, from the second BIOS sub-system to the first BIOS sub-system based on the fourth switching request.

In some embodiments of the present application, when receiving the fourth switching request, the host transmits an ESPI instruction to the BMC control chip, and performs a BIOS sub-system switching operation, to switch from the second BIOS sub-system to the first BIOS sub-system.

In some other embodiments of the present application, the method further includes:

S15-7: flashing, by the host, the second BIOS sub-system in response to the value of the flag register being the third preset value.

In some embodiments of the present application, as shown in FIG. 3, when the value of the flag register is the third preset value, the second BIOS sub-system is flashed through the host.

S15-8: switching, by the host, from the second BIOS sub-system to the first BIOS sub-system in response to flash of the second BIOS sub-system being completed.

In some embodiments of the present application, after flashing the second BIOS sub-system, the host performs a BIOS sub-system switching operation, to switch from the second BIOS sub-system to the first BIOS sub-system.

S15-9: modifying the value of the flag register to the first preset value.

In some embodiments of the present application, after the dual BIOS system is flashed and the currently running sub-system is switched to the original BIOS sub-system, the value of the flag register is modified to the first preset value, that is, the value of the flag register is restored to the default value.

S16: performing data access by using the BIOS sub-system.

In some embodiments of the present application, after the BIOS sub-system for data access is determined, data access is performed by using the BIOS sub-system.

In some embodiments of the present application, when the execution entity is the BMC control chip, before the transmitting, by the BMC control chip, a first switching request to the host through, the method further includes:

S21: flashing, by the BMC control chip, the first BIOS sub-system.

In some embodiments of the present application, as shown in FIG. 3, when the BMC control chip is determined as the execution entity, the data of the first BIOS sub-system is flashed through the BMC control chip.

S22: setting the value of the flag register to the second preset value.

In some embodiments of the present application, the flag register (FlashFlag) is configured to indicate a flash entity of the first BIOS sub-system. When the value of the flag register is the second preset value, it indicates that the flash entity of the first BIOS sub-system is the BMC control chip.

In some embodiments of the present application, after the first BIOS sub-system is flashed through the BMC control chip, the value of the flag register is set to the second preset value.

Exemplarily, the second preset value is 1.

In some other embodiments of the present application, when the execution entity is the host, before switching, by the host, from the first BIOS sub-system to the second BIOS sub-system, the method further includes:

S41: flashing, by the host, the first BIOS sub-system.

In some embodiments of the present application, when the host is determined as the execution entity, the data of the first BIOS sub-system is flashed through the host.

S42: setting the value of the flag register to the third preset value.

In some embodiments of the present application, the third preset value indicates that the execution entity that flashes the first BIOS sub-system is the host.

In some embodiments of the present application, after the data of the first BIOS sub-system is flashed through the host, the value of the flag register is set to the third preset value.

In some other embodiments of the present application, the method further includes:

S51: reading system data of the first BIOS sub-system in response to the host operating normally.

Figure 4:
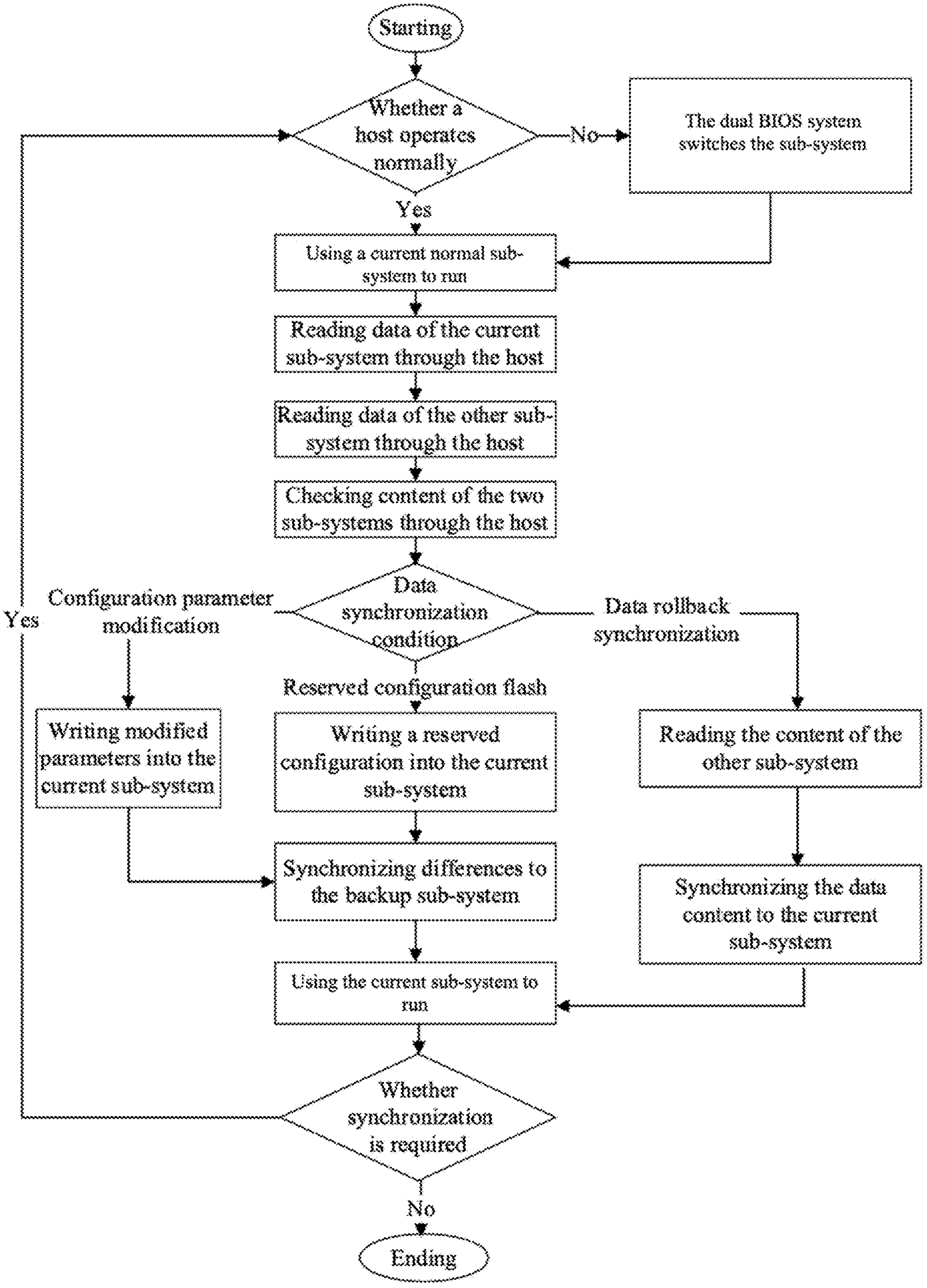
FIG. 4 is a schematic diagram of a data synchronization process of a dual BIOS system according to some embodiments of the present application.

In some embodiments of the present application, as shown in FIG. 4, which is a schematic diagram of a data synchronization process of a dual BIOS system proposed in some embodiments of the present application, when the host operates normally, the host reads system data of the first BIOS sub-system.

In some embodiments of the present application, when reading the system data of the first BIOS sub-system, the host directly read the system data from a connected first BIOS chip.

S52: reading system data of the second BIOS sub-system.

In some embodiments of the present application, after the data of the first BIOS sub-system is read, the system data of the second BIOS sub-system is read.

In some embodiments of the present application, when reading the system data of the second BIOS sub-system, the host transmits an ESPI data access instruction to the BMC, to access the system data of the second BIOS sub-system on the second BIOS chip connected to the BMC control chip.

S53: performing data check on the system data of the first BIOS sub-system and the system data of the second BIOS sub-system.

In some embodiments of the present application, data check is performed on the data of the first BIOS sub-system and the system data of the second BIOS sub-system, that is, the data of the two sub-systems is compared, to determine a difference between the system data of the two sub-systems.

S54: performing data synchronization on the system data of the first BIOS sub-system and the system data of the second BIOS sub-system based on a data check result.

In some embodiments of the present application, the performing data synchronization on the system data of the first BIOS sub-system and the system data of the second BIOS sub-system based on a data check result includes the following steps:

S54-1: synchronously backing up modified parameters to the second BIOS sub-system in response to parameters of the first BIOS sub-system being modified.

In some embodiments of the present application, as shown in FIG. 4, when the parameters of the first BIOS sub-system are modified, the modified parameters are written into a chip on which a current BIOS sub-system runs, and meanwhile, differences, namely, the modified parameters, are synchronously backed up to the second BIOS sub-system, that is, written into the chip on which the second BIOS sub-system runs.

S54-2: writing a reserved configuration into the first BIOS sub-system in response to performing reserved configuration flash on the first BIOS sub-system.

In some embodiments of the present application, the reserved configuration flash refers to that flash is performed while some certain existing parameters are reserved. The reserved configuration is kept unaltered.

In some embodiments of the present application, when reserved configuration flash is performed, the reserved configuration is written into the current BIOS sub-system, namely, the first BIOS sub-system running on the first BIOS chip.

S54-3: backing up the system data of the first BIOS sub-system to the second BIOS sub-system.

In some embodiments of the present application, after reserved configuration flash is performed on the first BIOS sub-system, flashed data of the first BIOS sub-system is backed up to the second BIOS sub-system, that is, stored into the second BIOS chip.

S54-4: reading the system data of the second sub-system in response to performing data rollback synchronization on the first BIOS sub-system.

In some embodiments of the present application, data rollback synchronization refers to that the data of the first BIOS sub-system is rolled back to be identical to the system data of the second BIOS sub-system. When the first BIOS sub-system fails, abnormal data is deleted by such as method, to restore data.

In some embodiments of the present application, when data rollback synchronization is performed on the first BIOS sub-system, the system data of the second BIOS is read, that is, the data is acquired from the second BIOS chip.

S54-5: synchronizing the system data of the second BIOS sub-system to the first BIOS sub-system.

In some embodiments of the present application, after being read from the second BIOS chip, the system data of the second BIOS sub-system is synchronized to the first BIOS sub-system.

In some other embodiments of the present application, the method further includes:

S61: switching from the first BIOS sub-system to the second BIOS sub-system in response to the host operating abnormally.

In some embodiments of the present application, as shown in FIG. 4, when the host operates abnormally, it is determined that sub-system switching of the dual BIOS system is required. In this case, the sub-system switching process is performed, and data synchronization is performed after the switching process is completed.

In some embodiments of the present application, real-time dual BIOS system data access and sub-system synchronization may be implemented, and simultaneous access and data check of dual BIOS firmware data content may be performed in real time. It supports synchronization of the configuration of the running BIOS to the backup BIOS chip after modification, synchronization and updating of configuration content to the backup BIOS chip after reserved configuration flash is performed on the BIOS, and synchronization of the data of the backup BIOS sub-system to the abnormal BIOS sub-system after the currently running BIOS sub-system is switched from the abnormal BIOS sub-system to the backup BIOS sub-system for successful boot, thereby further improving reliability of a server system.

In some embodiments of the present application, the standard protocol specifications of the SPI and the ESPI are fully adopted. Based on this, by utilizing a chip access channel and a sharing function of the ESPI, the host and the BMC control chip enable chip access links in respective directions in response to the conditions being satisfied, and may also freely perform BIOS sub-system switching and data synchronize, thereby greatly reducing costs of an architecture and improving efficiency of sub-system switching and data synchronization. Based on the new physical architecture, sub-system switching of the dual BIOS system is optimized and implemented. BIOS sub-system switching may be manually implemented in a case of normal or abnormal server startup. BIOS sub-system switching may be automatically implemented when an operating system boots and crashes or other abnormalities occur. It supports switching the BIOS sub-system for flash when the BIOS is flashed through an out-of-band system or tool such as the BMC. A new function of switching the BIOS chip for flash when the BIOS is flashed under the operating system. Furthermore, all corresponding switching controls and actions are interactively completed by the host and the BMC using the ESPI and SPI interactions, and do not involve a third-party chip control device. In addition, data synchronization and updating may be performed in real time according to requirements, updating of the data in the two BIOS chips is supported under various conditions.

Figure 5:
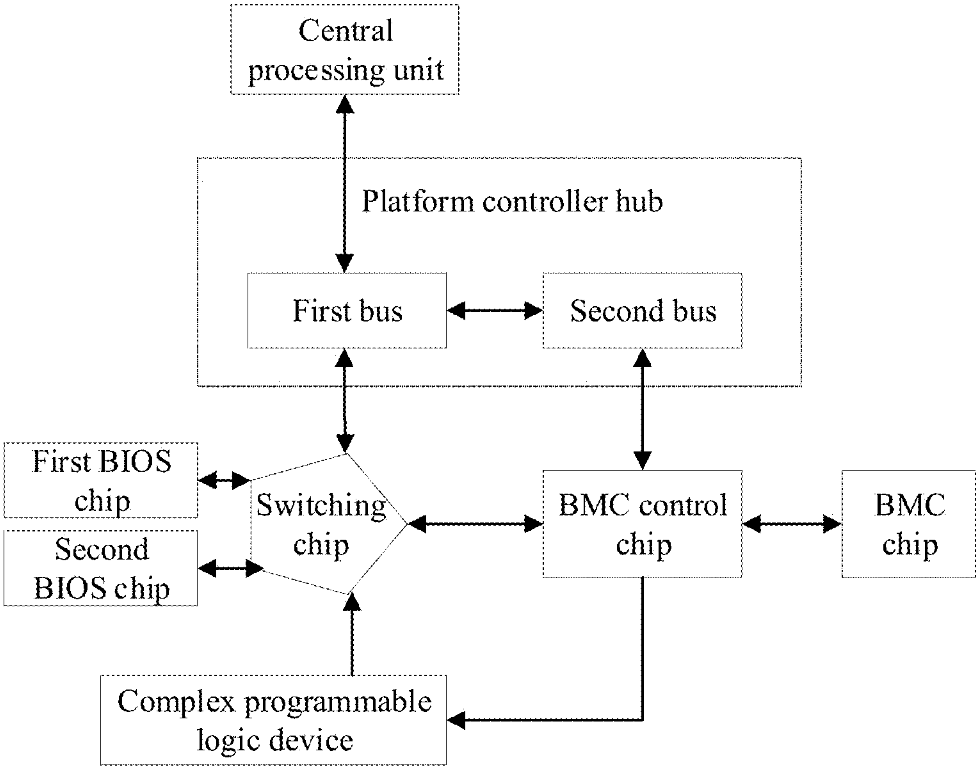
FIG. 5 is a schematic structural diagram of a dual BIOS system according to some embodiments of the present application.

Refer to FIG. 5. FIG. 5 is a schematic structural diagram of a dual BIOS system proposed in some embodiments of the present application. The system includes:

- a first BIOS chip, configured to run a first BIOS sub-system;
- a second BIOS chip, configured to run a second BIOS sub-system;
- a BMC chip, configured to run a BMC program;
- a switching chip, configured to control connections between the first BIOS chip and the second BIOS chip, the switching chip being connected to the first BIOS chip and the second BIOS chip; and a complex programmable logic device, configured to control the switching chip to perform link switching, the complex programmable logic device being connected to the switching chip.

In some embodiments of the present application, the switching chip (switch) may control an execution entity of the dual BIOS system to be connected to the first BIOS chip or the second BIOS chip, and a link for connection may be freely switched according to an actual situation.

The dual BIOS system further includes a BMC control chip, configured to control the BMC chip, the BMC control chip being connected to the BMC chip, the complex programmable logic device, and the switching chip; and a platform controller hub, connected to the switching chip via a first bus and connected to the BMC control chip via a second bus, the platform controller hub being connected to a CPU, and the first bus being connected to the second bus.

In some embodiments of the present application, the first bus is an SPI, and the second bus is an ESPI.

In some embodiments of the present application, an access entity of the dual BIOS system includes a host and the BMC control chip.

In some embodiments of the present application, when the BMC control receives a sub-system switching instruction, the BMC control chip transmits a sub-system switching request instruction to the complex programmable logic device.

In some embodiments of the present application, the sub-system switching instruction is an instruction issued by an operator to the BMC control chip and is configured for switching from a currently running BIOS sub-system. The sub-system switching request instruction is an instruction transmitted by the BMC control chip and is configured for switching from the currently running BIOS sub-system.

In some embodiments of the present application, the BMC control chip controls the dual BIOS system to perform a shutdown operation.

In some embodiments of the present application, when the complex programmable logic device receives the sub-system switching request instruction, the complex programmable logic device transmits a line switching instruction to the switching chip.

In some embodiments of the present application, the line switching instruction is an instruction generated when the complex programmable logic device receives the sub-system switching request instruction and is configured for controlling the switching chip to switch from a currently connected BIOS chip.

In some embodiments of the present application, when the switching chip receives the line switching instruction, the switching chip switches the connected chip from the first BIOS chip to the second BIOS chip.

In some embodiments of the present application, the dual BIOS system uses the second BIOS sub-system for startup and boot.

In some embodiments of the present application, in response to an operating system boot failure, the BMC control chip transmits a sub-system switching request instruction to the complex programmable logic device.

In some embodiments of the present application, the BMC control chip controls the dual BIOS system to perform the shutdown operation.

In some embodiments of the present application, when the complex programmable logic device receives the sub-system switching request instruction, the complex programmable logic device transmits a line switching instruction to the switching chip.

In some embodiments of the present application, when the switching chip receives the line switching instruction, the switching chip switches the connected chip from the first BIOS chip to the second BIOS chip.

In some embodiments of the present application, the dual BIOS system uses the second BIOS sub-system for startup and boot.

In some embodiments of the present application, in response to sub-system flash is required to be performed on the dual BIOS sub-system, the BMC control transmits a sub-system switching request instruction to the complex programmable logic device.

In some embodiments of the present application, the BMC control chip controls the dual BIOS system to perform the shutdown operation.

In some embodiments of the present application, when the complex programmable logic device receives the sub-system switching request instruction, the complex programmable logic device transmits a first line switching instruction to the switching chip.

In some embodiments of the present application, when the switching chip receives the first line switching instruction, the switching chip switches the connected chip from the first BIOS chip to the second BIOS chip.

In some embodiments of the present application, the complex programmable logic device transmits a second line switching instruction to the switching chip.

In some embodiments of the present application, when the switching chip receives the second line switching instruction, the switching chip switches the access entity from the host to the BMC control chip.

In some embodiments of the present application, the BMC control chip performs sub-system flash on the second BIOS chip.

In some embodiments of the present application, when flash of the sub-system on the second BIOS chip is completed, the BMC transmits a sub-system switching request instruction to the complex programmable logic device.

In some embodiments of the present application, when the complex programmable logic device receives the sub-system switching request instruction, the complex programmable logic device transmits a third line switching instruction to the switching chip.

In some embodiments of the present application, when the switching chip receives the third line switching instruction, the switching chip switches the connected chip from the second BIOS chip to the first BIOS chip.

In some embodiments of the present application, the BMC control chip performs sub-system flash on the first BIOS chip.

In some embodiments of the present application, when flash of the sub-system on the first BIOS chip is completed, the complex programmable logic device transmits a fourth line switching instruction to the switching chip.

In some embodiments of the present application, in a case that the switching chip receives the fourth line switching instruction, the switching chip switches the access entity from the BMC control chip to the host.

In some embodiments of the present application, the dual BIOS system uses the first BIOS sub-system for startup and boot.

In some embodiments of the present application, as shown in FIG. 5, the switching chip is connected to the first BIOS chip, the second BIOS chip, and the SPI, and the complex programmable logic device is responsible for controlling the switching chip. Through such a structure, the complex programmable logic device controls the switching chip to be connected to any BIOS chip for communication data access, and only one of the platform controller hub and the BMC control chip has access to the connected BIOS chip.

Figure 6:
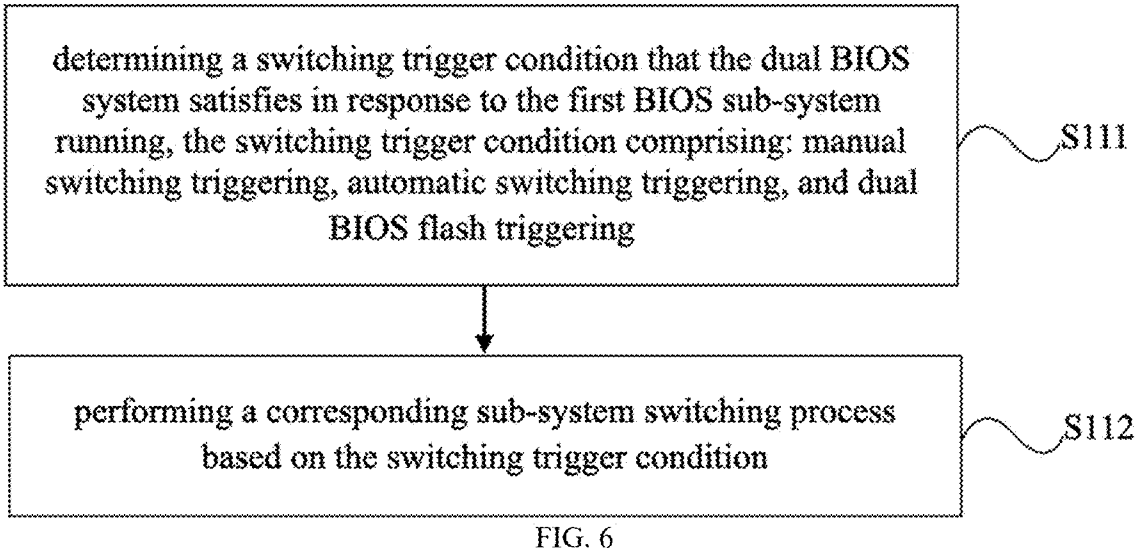
FIG. 6 is a flowchart of a system switching method according to some embodiments of the present application.

Refer to FIG. 6. FIG. 6 is a flowchart of a system switching method proposed in some embodiments of the present application. As shown in FIG. 6, the method includes the following steps:

S111: determining a switching trigger condition that a dual BIOS system satisfies in response to a first BIOS sub-system running, the switching trigger condition including: manual switching triggering, automatic switching triggering, and dual BIOS flash triggering.

In some embodiments of the present application, when the first BIOS sub-system runs, the switching trigger condition that the dual BIOS system satisfies is determined. The switching trigger condition includes: the manual switching triggering, the automatic switching triggering, and the dual BIOS flash triggering.

S112: performing a corresponding sub-system switching process based on the switching trigger condition.

In some embodiments of the present application, when sub-system switching is required, the corresponding sub-system switching process is performed according to the switching trigger condition.

In some embodiments of the present application, the performing a corresponding sub-system switching process according to the switching trigger condition includes:

S112-1: controlling, by a complex programmable logic device, a switching chip to switch from the first BIOS sub-system to the second BIOS sub-system in response to the switching trigger condition being the manual switching triggering.

In some embodiments of the present application, the switching chip is controlled through the complex programmable logic device to switch from the first BIOS sub-system to the second BIOS sub-system when the switching trigger condition is the manual switching triggering.

S112-2: controlling, by the BMC control chip, the dual BIOS system to perform a shutdown operation.

In some embodiments of the present application, the BMC control chip controls the dual BIOS system to perform the shutdown operation.

S112-3: determining a value of a flag register.

In some embodiments of the present application, when the BMC controls the dual BIOS system to perform the shutdown operation and then perform startup and boot, the value of the flag register is determined.

S112-4: using the second BIOS sub-system for startup and boot in response to the value of the flag register being not a first preset value.

In some embodiments of the present application, when the value of the flag register is not the first preset value, the second BIOS sub-system is used for startup and boot.

In some embodiments of the present application, the method further includes:

S112-5: transmitting, by the BMC control chip, a sub-system switching request instruction to the complex programmable logic device in response to the switching trigger condition being the automatic switching triggering.

In some embodiments of the present application, when the switching trigger condition is the automatic switching triggering, the BMC control chip transmits the sub-system switching request instruction to the complex programmable logic device.

S112-6: controlling, by the BMC control chip, the dual BIOS system to perform the shutdown operation.

In some embodiments of the present application, the BMC control chip controls the dual BIOS system to perform the shutdown operation.

S112-7: controlling a switching chip to switch from the first BIOS sub-system to the second BIOS sub-system in response to the complex programmable logic device receiving the sub-system switching request instruction.

In some embodiments of the present application, when the complex programmable logic device receives the sub-system switching request instruction, the complex programmable logic device controls the switching chip to switch from the first BIOS sub-system to the second BIOS sub-system.

S112-8: determining the value of the flag register.

In some embodiments of the present application, the current value of the flag register is determined.

S112-9: using the second BIOS sub-system for startup and boot in response to the value of the flag register being not the first preset value.

In some embodiments of the present application, when the value of the flag register is not the first preset value, the second BIOS sub-system is used for startup and boot.

In some embodiments of the present application, the method further includes:

S112-10: setting the value of the flag register to the first preset value in response to the switching trigger condition being the dual BIOS flash triggering.

In some embodiments of the present application, when the switching trigger condition is the dual BIOS flash triggering, the value of the flag register is set to the first preset value.

S112-11: transmitting, by the BMC control chip, the sub-system switching request instruction to the complex programmable logic device.

In some embodiments of the present application, the BMC control chip transmits the sub-system switching request instruction to the complex programmable logic device.

S112-12: controlling, by the BMC control chip, the dual BIOS system to perform the shutdown operation.

In some embodiments of the present application, the BMC control chip controls the dual BIOS system to perform the shutdown operation.

S112-13: controlling, by the complex programmable logic device, the switching chip to switch from the first BIOS sub-system to the second BIOS sub-system.

In some embodiments of the present application, the complex programmable logic device controls the switching chip to switch from the first BIOS sub-system to the second BIOS sub-system.

S112-14: acquiring the value of the flag register.

In some embodiments of the present application, the value of the flag register is acquired.

S112-15: controlling, by the complex programmable logic device, the switching chip to switch an access entity of the dual BIOS system from a host to the BMC control chip in response to the value of the flag register being the first preset value.

In some embodiments of the present application, when the value of the flag register is the first preset value, the complex programmable logic device controls the switching chip to switch a current access entity from the host to the BMC control chip.

S112-16: flashing, by the BMC control chip, the second BIOS sub-system.

In some embodiments of the present application, the BMC control chip performs sub-system flash on the second BIOS sub-system.

S112-17: transmitting, by the BMC control chip, the sub-system switching request instruction to the complex programmable logic device in response to flash of the second BIOS sub-system being completed.

In some embodiments of the present application, when flash of the second BIOS sub-system is completed, the BMC control chip transmits the sub-system switching request instruction to the complex programmable logic device.

S112-18: controlling the switching chip to switch from the second BIOS sub-system to the first BIOS sub-system in response to the complex programmable logic device receiving the sub-system switching request instruction.

In some embodiments of the present application, the complex programmable logic device controls the switching chip to switch from the second BIOS sub-system to the first BIOS sub-system when the complex programmable logic device receives the sub-system switching request instruction.

S112-19: flashing, by the BMC control chip, the first BIOS sub-system.

In some embodiments of the present application, the BMC control chip performs sub-system flash on the first BIOS sub-system.

S112-20: clearing the value of the flag register in response to flash of the first BIOS sub-system being completed.

In some embodiments of the present application, the value of the flag register is cleared in a case that flash of the first BIOS sub-system is completed.

S112-21: controlling, by the complex programmable logic device, the switching chip to switch the access entity of the dual BIOS system from the BMC control chip to the host.

In some embodiments of the present application, the complex programmable logic device controls the switching chip to switch the current access entity from the BMC control chip to the host.

S112-22: using, by the dual BIOS system, the first BIOS sub-system for startup and boot.

In some embodiments of the present application, the dual BIOS system uses the first BIOS sub-system for startup and boot.

Figure 7:
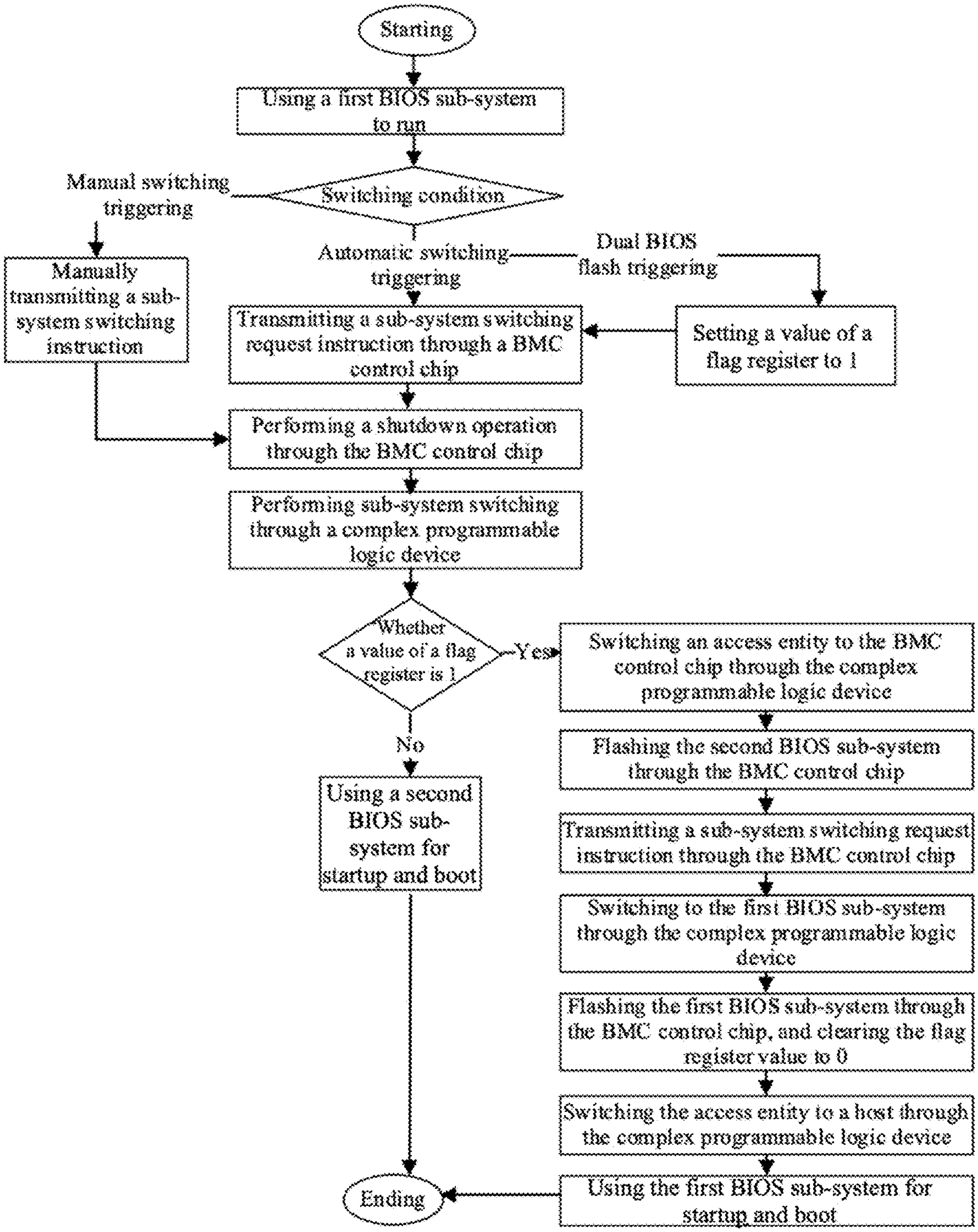
FIG. 7 is a schematic diagram of a switching process of a dual BIOS system according to some embodiments of the present application.

In some embodiments of the present application, a sub-system switching process of a BIOS is shown in FIG. 7. FIG. 7 is a schematic diagram of a dual BIOS system switching process proposed in some embodiments of the present application. The switching process is as follows:

S000: starting sub-system switching.

S001: assuming that a first BIOS chip is selected by default to boot a system (when it is the second BIOS chip, the second BIOS chip in subsequent steps is replaced with the first BIOS chip).

S002: determining a trigger condition for switching the BIOS sub-system to the second BIOS sub-system, and performing S003 in a case of manual switching triggering, performing S004 in a case of out-of-band dual BIOS flash triggering, or performing S005 in a case of automatic switching triggering.

S003: manually transmitting an instruction for switching to the second BIOS chip, namely, a sub-system switching instruction, by using a tool, and then, performing S006.

S004: setting a flag register (FlashFlag) value indicating flash of the dual BIOS to 1 through the BIOS, and performing corresponding actions in the subsequent steps according to the value of the flag register.

S005: automatically transmitting an instruction for switching to the second BIOS sub-system to the complex programmable logic device through the BMC control chip, and notifying the complex programmable logic device to prepare for switching to the second BIOS sub-system.

S006: performing a shutdown instruction through the BMC control chip, to shut down the system.

S007: controlling a path of an SPI switching chip through the complex programmable logic device, to connect the switching chip to the second BIOS chip.

S008: determining whether the value of the flag register is 1, and performing step S009 when the value of the flag register is 1, or performing step S015 when the value of the flag register is not 1.

S009: controlling the path of the SPI switching chip through the complex programmable logic device, to switch SPI access of the switching chip to the BMC system.

S010: accessing the second BIOS sub-system through the BMC and flashing the version of the BIOS.

S011: automatically transmitting an instruction for switching to the first BIOS sub-system to the complex programmable logic device through the BMC control chip, and notifying the complex programmable logic device to prepare for switching to the first BIOS sub-system.

S012: controlling the path of the SPI switching chip through the complex programmable logic device, to connect the switching chip to the first BIOS chip.

S013: accessing the first BIOS sub-system through the BMC and flashing the version of the BIOS, and clearing the value of the flag register to 0.

S014: controlling the path of the SPI switching chip through the complex programmable logic device, to switch SPI access of the switching chip to the host.

S015: using the first BIOS sub-system by the dual BIOS system for startup and boot, and then, performing step S017.

S016: using the second BIOS sub-system by the dual BIOS system for startup and boot.

S017: ending sub-system switching.

In some embodiments of the present application, in a case that the first BIOS sub-system runs, the switching trigger condition that the dual BIOS system satisfies is determined, and when sub-system switching is required, the corresponding sub-system switching process is performed according to the switching trigger condition. This ensures normal running of the BIOS system during boot of an operating system of a server, and further ensures stable boot and running of the operating system.

Figure 8:
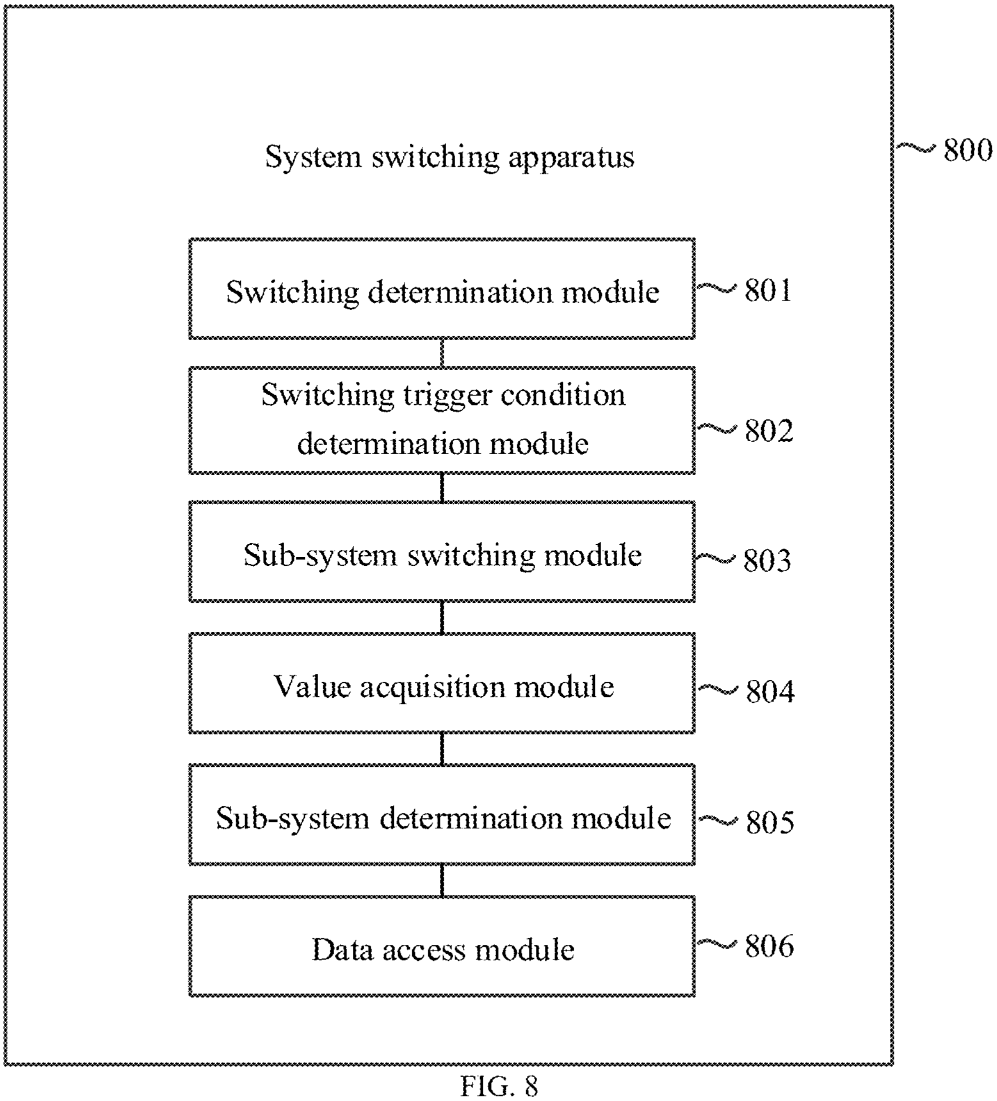
FIG. 8 is a schematic diagram of a system switching apparatus according to some embodiments of the present application.

Based on the same inventive concept, some embodiments of the present application provide a system switching apparatus. Refer to FIG. 8. FIG. 8 is a schematic diagram of a system switching apparatus 800 proposed in some embodiments of the present application. As shown in FIG. 8, the apparatus includes:

- a switching determination module 801, configured to determine whether sub-system switching is required in a case that a first BIOS sub-system runs;
- a switching trigger condition determination module 802, configured to determine a switching trigger condition satisfies by a dual BIOS system in a case that sub-system switching is required, the switching trigger condition including: dual BIOS flash triggering, automatic switching triggering, and manual switching triggering;
- a sub-system switching module 803, configured to switch from the currently running first BIOS sub-system to a second BIOS sub-system in a corresponding switching manner according to the trigger condition;
- a value acquisition module 804, configured to acquire a value of a flag register in a case that sub-system switching is completed;
- a sub-system determination module 805, configured to determine a BIOS sub-system for data access according to the value of the flag register; and
- a data access module 806, configured to perform data access by using the BIOS sub-system.

In some embodiments, the sub-system switching module includes:

- a first execution entity determination sub-module, configured to determine an execution entity that flashes the first BIOS sub-system in response to the switching trigger condition being the dual BIOS flash triggering;
- a first transmission sub-module, configured to transmit a first switching request to a host through a BMC control chip in response to the execution entity being the BMC control chip; and
- a first switching sub-module, configured to switch from the first BIOS sub-system to the second BIOS sub-system through the host based on the first switching request.

In some embodiments, the apparatus further includes:

- a first data flashing sub-module, configured to flash the first BIOS sub-system through the BMC control chip; and
- a first register value setting sub-module, configured to set the value of the flag register to a second preset value.

In some embodiments, the apparatus further includes:

- a second switching sub-module, configured to switch from the first BIOS sub-system to the second BIOS sub-system through the host in response to the execution entity being the host.

In some embodiments, the apparatus further includes:

- a second data flashing sub-module, configured to flash the first BIOS sub-system through the host; and
- a second register value setting sub-module, configured to set the value of the flag register to a third preset value.

In some embodiments, the apparatus further includes:

- a first receiving sub-module, configured to receive a sub-system switching instruction through the BMC control chip in response to the switching trigger condition being the manual switching triggering;
- a second transmission sub-module, configured to transmit a second switching request to the host through the BMC control chip; and a third sub-system switching sub-module, configured to switch from the first BIOS sub-system to the second BIOS sub-system through the host based on the second switching request.

In some embodiments, the apparatus further includes:

a second execution entity determination sub-module, configured to determine an execution entity corresponding to the automatic switching triggering in response to the switching trigger condition being the automatic switching triggering;

a third transmission sub-module, configured to transmit a third switching request to the host through the BMC control chip in response to the execution entity being the BMC control chip; and a third switching sub-module, configured to switch from the first BIOS sub-system to the second BIOS sub-system through the host based on the third switching request.

In some embodiments, the apparatus further includes:

a fourth switching sub-module, configured to switch from the first BIOS sub-system to the second BIOS sub-system through the host in response to the execution entity being the host.

In some embodiments, the sub-system determination module includes:

a first sub-system determination sub-module, configured to determine the BIOS sub-system used for the data access as the second BIOS sub-system in response to the value of the flag register being a first preset value;

a second sub-system determination sub-module, configured to determine the BIOS sub-system used for the data access as the first BIOS sub-system in response to the value of the flag register being the second preset value; and a third sub-system determination sub-module, configured to determine the BIOS sub-system used for the data access as the first BIOS sub-system as the BIOS sub-system for data access in response to the value of the flag register being the third preset value.

In some embodiments, the apparatus further includes:

a third data flashing sub-module, configured to flash the second BIOS sub-system through the BMC control chip in response to the value of the flag register being the second preset value;

a fourth transmission sub-module, configured to transmit a fourth switching request to the host through the BMC control chip in response to flash of the second BIOS sub-system being completed; and a fourth switching sub-module, configured to switch from the second BIOS sub-system to the first BIOS sub-system through the host based on the fourth switching request.

In some embodiments, the apparatus further includes:

a fourth data flashing sub-module, configured to flash the second BIOS sub-system through the host in response to the value of the flag register being the third preset value;

a fifth switching sub-module, configured to switch from the second BIOS sub-system to the first BIOS sub-system through the host in response to flash of the second BIOS sub-system being completed; and a third register value setting sub-module, configured to modify the value of the flag register to the first preset value.

In some embodiments, the apparatus further includes:

a first data reading module, configured to read system data of the first BIOS sub-system in response to the host operating normally;

a second data reading module, configured to read system data of the second BIOS sub-system;

a data check module, configured to perform data check on the system data of the first BIOS sub-system and the system data of the second BIOS sub-system; and a data synchronization module, configured to perform data synchronization on the system data of the first BIOS sub-system and the system data of the second BIOS sub-system based on a data check result.

In some embodiments, the data synchronization module includes:

a first data synchronization sub-module, configured to synchronously back up modified parameters to the second BIOS sub-system in response to parameters of the first BIOS sub-system being modified;

a data writing sub-module, configured to write a reserved configuration into the first BIOS sub-system in response to performing reserved configuration flash on the first BIOS sub-system;

a second data synchronization sub-module, configured to back up the system data of the first BIOS sub-system to the second BIOS sub-system;

a third data synchronization sub-module, configured to read the system data of the second BIOS sub-system in response to performing data rollback synchronization on the first BIOS sub-system; and a fourth data synchronization sub-module, configured to synchronize the system data of the second BIOS sub-system to the first BIOS sub-system.

In some embodiments, the apparatus further includes:

a second sub-system switching module, configured to switch from the first BIOS sub-system to the second BIOS sub-system in response to the host operating abnormally.

Figure 9:
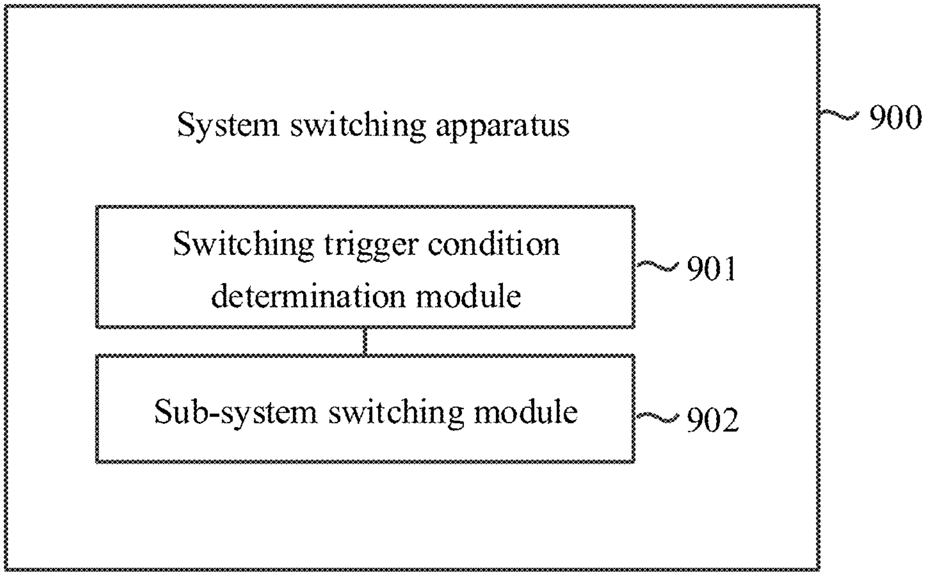
FIG. 9 is a schematic diagram of a system switching apparatus according to some embodiments of the present application.

Based on the same inventive concept, some embodiments of the present application provide a system switching apparatus. Refer to FIG. 9. FIG. 9 is a schematic diagram of a system switching apparatus 900 proposed in some embodiments of the present application. As shown in FIG. 9, the apparatus includes:

a switching trigger condition determination module 901, configured to determine a switching trigger condition that a dual BIOS system satisfies in a case that a first BIOS sub-system runs, the switching trigger condition including: manual switching triggering, automatic switching triggering, and dual BIOS flash triggering; and a sub-system switching module 902, configured to perform a corresponding sub-system switching process according to the switching trigger condition.

In some embodiments, the sub-system switching module includes:

a manual switching sub-module, configured to control the switching chip through the complex programmable logic device to switch from the first BIOS sub-system to the second BIOS sub-system in response to the switching trigger condition being the manual switching triggering;

a first shutdown operation sub-module, configured to control the dual BIOS system through a BMC control chip to perform a shutdown operation;

a first data determination sub-module, configured to determine a current value of a flag register; and

- a first startup and boot sub-module, configured to use the second BIOS sub-system for startup and boot in response to the value of the flag register being not a first preset value.

In some embodiments, the sub-system switching module further includes:

- an automatic switching sub-module, configured to transmit a sub-system switching request instruction to the complex programmable logic device through the BMC control chip in response to the switching trigger condition being the automatic switching triggering;
- a second shutdown operation sub-module, configured to control the dual BIOS system through the BMC control chip to perform the shutdown operation;
- an automatic switching performing sub-module, configured to control the switching chip to switch from the first BIOS sub-system to the second BIOS sub-system in response to the complex programmable logic device receiving the sub-system switching request instruction;
- a second value determination sub-module, configured to determine the current value of the flag register; and
- use the second BIOS sub-system for startup and boot in response to the value of the flag register being not the first preset value.

In some embodiments, the sub-system switching module further includes:

- a value setting sub-module, configured to set the value of the flag register to the first preset value in response to the switching trigger condition being the dual BIOS flash triggering;
- a first instruction transmission sub-module, configured to transmit the sub-system switching request instruction to the complex programmable logic device through the BMC control chip;
- a third shutdown operation sub-module, configured to control the dual BIOS system through the BMC control chip to perform the shutdown operation;
- a first flash switching performing sub-module, configured to control the switching chip through the complex programmable logic device to switch from the first BIOS sub-system to the second BIOS sub-system;
- a third value determination sub-module, configured to acquire the value of the flag register;
- an access entity switching sub-module, configured to control the switching chip through the complex programmable logic device to switch an access entity of the dual BIOS system from a host to the BMC control chip in response to the value of the flag register being the first preset value;
- a first sub-system flashing sub-module, configured to flash the second BIOS sub-system through the BMC control chip;
- a second instruction transmission sub-module, configured to transmit a sub-system switching request instruction to the complex programmable logic device through the BMC control chip in response to flash of the second BIOS sub-system being completed;
- a second flash switching performing sub-module, configured to control the switching chip to switch from the second BIOS sub-system to the first BIOS sub-system in response to the complex programmable logic device receiving the sub-system switching request instruction;
- a second sub-system flashing sub-module, configured to flash the first BIOS sub-system through the BMC control chip;
- a value clearing sub-module, configured to clear the value of the flag register in response to flash of the first BIOS sub-system being completed;
- a second access entity switching sub-module, configured to control the switching chip through the complex programmable logic device to switch the access entity of the dual BIOS system from the BMC control chip to the host; and
- a third startup and boot sub-module, configured to use the first BIOS sub-system of the dual BIOS system for startup and boot.

Based on the same inventive concept, some other embodiments of the present application provide a non-transitory readable storage medium, which has a computer program stored therein. A processor executes the program to implement the steps in the system switching method according to some embodiments of the present application.

Figure 10:
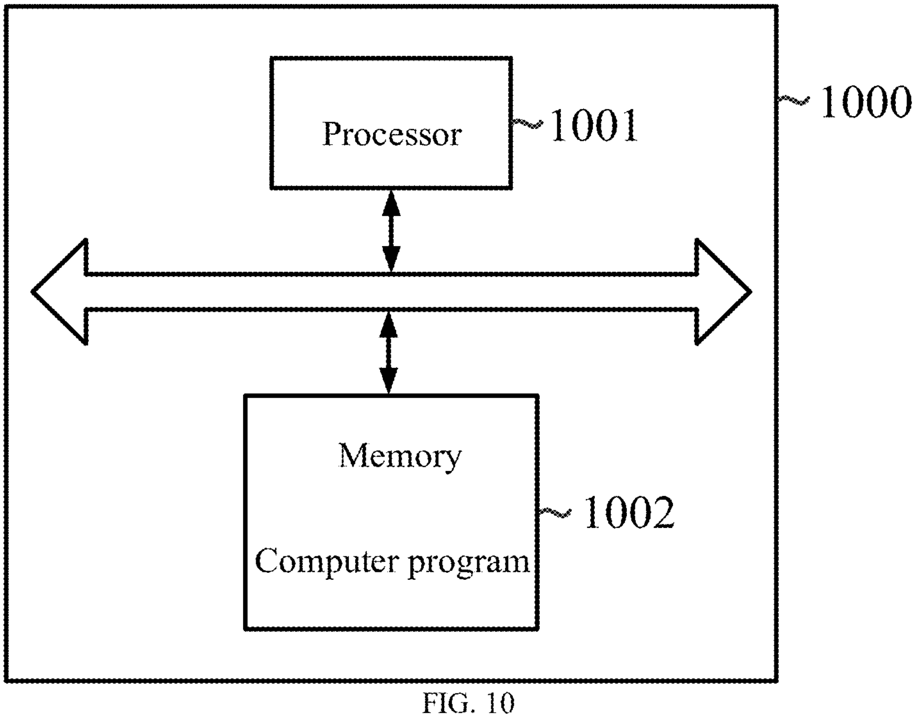
FIG. 10 is a schematic diagram of an electronic device according to some embodiments of the present application.

Based on the same inventive concept, some other embodiments of the present application provide an electronic device. As shown in FIG. 10, which is a schematic diagram of an electronic device 1000 proposed in some embodiments of the present application, the electronic device includes a memory 1002, a processor 1001, and a computer program stored in the memory and running on the processor. The processor executes the computer program to implement the steps in the system switching method according to some embodiments of the present application.

For some embodiments of the device, due to their basic similarity with some embodiments of the method, the description is relatively simple. For relevant information, please refer to the partial explanation of some embodiments of the method.

The various embodiments in this specification are described in a progressive manner, with each embodiment emphasizing its differences from other embodiments. The same and similar parts between the various embodiments may be referred to each other.

Persons skilled in the art should understand that some embodiments of the present application may be provided as methods, devices, or computer program products. Therefore, some embodiments of the present application may take the form of fully hardware embodiments, fully software embodiments, or embodiments combining software and hardware aspects. Moreover, some embodiments of the present application may take the form of a computer program product implemented on one or more computer usable non-transitory readable storage media (including but not limited to disk storage, CD-ROM, optical storage, etc.) containing computer usable program code.

Some embodiments of the present application are described with reference to flowcharts and/or block diagrams of methods, terminal devices (systems), and computer program products according to some embodiments of the present application. It should be understood that each process and/or block in the flowchart and/or block diagram, as well as the combination of processes and/or blocks in the flowchart and/or block diagram, may be implemented by computer program instructions. These computer program instructions may be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flowchart and/or one or more boxes in the block diagram.

These computer program instructions may also be stored in computer-readable memory that may guide a computer or other programmable data processing terminal device to operate in a specific manner, such that the instructions stored in the computer-readable memory generate a manufactured product including instruction devices that implement the functions specified in a flowchart or multiple flowcharts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flowchart and/or one or more boxes in the block diagram.

Although preferred embodiments of the present application have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present application.

Finally, it should be noted that in this specification, relational terms such as first and second are only used to distinguish one entity or operation from another, and do not necessarily require or imply any actual relationship or order between these entities or operations. Moreover, the terms "comprising/including", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element limited by the statement "including one . . . " does not exclude the existence of other identical elements in the process, method, item, or terminal device that includes the element.

The above provides a detailed introduction to the system switching method, device, equipment, and non-transitory readable storage medium provided in the present application. Specific examples are applied in this specification to explain the principles and implementation methods of the present application. The above embodiments are only used to assist in understanding the method and core ideas of this application. Meanwhile, for general technical personnel in this field, there may be changes in the specific implementation and application scope based on the ideas of the present application. Therefore, the content of this specification should not be understood as limiting the present application.

The invention claimed is:

1. A dual basic input/output system (BIOS) system, comprising:

- a first BIOS chip, configured to run a first BIOS sub-system;
- a second BIOS chip, configured to run a second BIOS sub-system;
- a baseboard management controller (BMC) chip, configured to run a BMC program;
- a BMC control chip, configured to control the BMC chip and the second BIOS chip, the BMC control chip being connected to the BMC chip and the second BIOS chip; and
- a platform controller hub, configured to control the first BIOS chip and the BMC control chip, the platform controller hub being connected to the first BIOS chip via a first bus and connected to the BMC control chip via a second bus, the first bus being connected to the second bus, and the platform controller hub being connected to a central processing unit (CPU);
- wherein an access entity of the dual BIOS system comprises a host and the BMC control chip, the host controls the first BIOS chip connected via the first bus, the BMC control chip controls the second BIOS chip, and the host and the BMC control chip perform interactive access by transmitting instructions using a data transmission protocol of the second bus;
- the host and the BMC control chip, in response to the first BIOS sub-system running and a sub-system switching being required, switch the first BIOS sub-system currently running to the second BIOS sub-system in a corresponding switching manner according to a switching trigger condition that the dual BIOS system satisfies, wherein the switching trigger condition comprises: dual BIOS flash triggering, automatic switching triggering, and manual switching triggering.

2. The dual BIOS system according to claim 1, wherein the BMC control chip, in response to the switching trigger condition being the dual BIOS flash triggering and an execution entity that flashes the first BIOS sub-system being the BMC control chip, transmits a sub-system switching request instruction to the host after performing sub-system flash on the first BIOS chip;

- the host switches from the first BIOS sub-system to the second BIOS sub-system in response to the host receiving the sub-system switching request instruction;
- the BMC control chip flashes the second BIOS sub-system on the second BIOS chip in response to a currently running BIOS sub-system being switched from the first BIOS sub-system to the second BIOS sub-system;
- the BMC control chip transmits the sub-system switching request instruction to the host in response to flash of the second BIOS sub-system on the second BIOS chip being completed; and
- the host switches from the second BIOS sub-system to the first BIOS sub-system in response to the host receiving the sub-system switching request instruction.

3. The dual BIOS system according to claim 1, wherein the host, in response to the switching trigger condition being the dual BIOS flash triggering and an execution entity that flashes the first BIOS sub-system being the host, switches from the first BIOS sub-system to the second BIOS sub-system after performing sub-system flash on the first BIOS sub-system on the first BIOS chip;

- the host flashes the second BIOS sub-system on the second BIOS chip in response to a currently running BIOS sub-system being switched from the first BIOS sub-system to the second BIOS sub-system; and
- the host switches from the second BIOS sub-system to the first BIOS sub-system in response to flash of the second BIOS sub-system on the second BIOS chip being completed.

4. The dual BIOS system according to claim 1, wherein the BMC control chip, in response to the switching trigger condition being the manual switching triggering and upon receiving a sub-system switching instruction, transmits a sub-system switching request instruction to the host; and the host switches from the first BIOS sub-system to the second BIOS sub-system in response to the host receiving the sub-system switching request instruction.

5. The dual BIOS system according to claim 1, wherein the host, in response to the switching trigger condition being the automatic switching triggering and an execution entity that performs the automatic switching triggering being the host, switches from the first BIOS sub-system to the second BIOS sub-system.

6. The dual BIOS system according to claim 1, wherein the automatic switching triggering comprises that BIOS sub-system switching is required upon detecting a failure of the operating system, and the BMC control chip transmits a sub-system switching request instruction to the host in response to the BMC control chip detecting an operating system boot failure; and the host switches from the first BIOS sub-system to the second BIOS sub-system in response to the host receiving the sub-system switching request instruction.

7. The dual BIOS system according to claim 1, wherein the host reads data from the first BIOS chip in response to the host operating normally;

the host transmits a data read instruction to the BMC control chip;

the BMC control chip transmits data from the second BIOS chip to the host in response to the BMC control chip receiving the data read instruction;

the host performs data check on the data from the first BIOS chip and the data from the second BIOS chip; and the host performs data synchronization on the first BIOS chip and the second BIOS chip based on a data check result.

8. A system switching method, applied to the dual BIOS system according to claim 1, and comprising:

determining whether sub-system switching is required in response to the first BIOS sub-system running;

determining a switching trigger condition that the dual BIOS system satisfies in response to the sub-system switching is required, the switching trigger condition comprising: dual BIOS flash triggering, automatic switching triggering, and manual switching triggering;

switching from the first BIOS sub-system currently running to the second BIOS sub-system in a corresponding switching manner based on the switching trigger condition;

acquiring a value of a flag register in response to a currently running BIOS sub-system is switched from the first BIOS sub-system to the second BIOS sub-system;

determining a BIOS sub-system used for data access based on the value of the flag register; and performing the data access by using the BIOS sub-system.

9. The method according to claim 8, wherein the switching from the first BIOS sub-system currently running to the second BIOS sub-system in a corresponding switching manner based on the switching trigger condition comprises:

determining an execution entity that flashes the first BIOS sub-system in response to the switching trigger condition being the dual BIOS flash triggering;

transmitting, by the BMC control chip, a first switching request to a host in response to the execution entity being the BMC control chip; and switching, by the host, from the first BIOS sub-system to the second BIOS sub-system based on the first switching request.

10. The method according to claim 9, wherein before the transmitting, by the BMC control chip, a first switching request to a host, the method further comprises:

flashing the first BIOS sub-system through the BMC control chip; and setting the value of the flag register to a second preset value.

11. The method according to claim 9, further comprising:

switching, by the host, from the first BIOS sub-system to the second BIOS sub-system in response to the execution entity being the host.

12. The method according to claim 11, wherein before the switching, by the host, from the first BIOS sub-system to the second BIOS sub-system, the method further comprises:

flashing, by the host, the first BIOS sub-system; and setting the value of the flag register to a third preset value.

13. The method according to claim 8, further comprising:

receiving, by the BMC control chip, a sub-system switching instruction in response to the switching trigger condition being the manual switching triggering;

transmitting, by the BMC control chip, a second switching request to a host; and switching, by the host, from the first BIOS sub-system to the second BIOS sub-system based on the second switching request.

14. The method according to claim 8, further comprising:

determining an execution entity corresponding to the automatic switching triggering in response to the switching trigger condition being the automatic switching triggering;

transmitting, by the BMC control chip, a third switching request to a host in response to the execution entity is the BMC control chip; and switching, by the host, from the first BIOS sub-system to the second BIOS sub-system based on the third switching request.

15. The method according to claim 14, further comprising:

switching, by the host, from the first BIOS sub-system to the second BIOS sub-system in response to the execution entity being the host.

16. The method according to claim 8, wherein the determining a BIOS sub-system used for data access based on the value of the flag register comprises:

determining the BIOS sub-system used for the data access as the second BIOS sub-system in response to the value of the flag register being a first preset value;

determining the BIOS sub-system used for the data access as the first BIOS sub-system in response to the value of the flag register being a second preset value; and determining the BIOS sub-system used for the data access as the first BIOS sub-system in response to the value of the flag register being a third preset value.

17. The method according to claim 16, further comprising:

flashing, by the BMC control chip, the second BIOS sub-system in response to the value of the flag register being the second preset value;

transmitting, by the BMC control chip, a fourth switching request to a host in response to flash of the second BIOS sub-system being completed; and switching, by the host, from the second BIOS sub-system to the first BIOS sub-system based on the fourth switching request.

18. A computer-readable storage medium, having a computer program stored therein, wherein the computer program, when executed by a processor, implements the steps in the method according to claim 8.

19. An electronic device, comprising a memory, a processor, and a computer program stored in the memory and running on the processor, wherein the computer program, when executed by the processor, implements the steps in the method according to claim 8.

* * * * *